US012699450B2

(12) United States Patent (10) Patent No.: US 12,699,450 B2
Qian (45) Date of Patent: Aug. 4, 2026

(54) METHODS AND SYSTEMS FOR COMPUTER-HUMAN INTERACTIONS

(71) Applicant: Cheng Qian, Weston, FL (US)

(72) Inventor: Cheng Qian, Weston, FL (US)

(73) Assignee: Cheng Qian, Weston, FL (US)

( * ) Notice: Subject to any disclaimer, the term of this patent is extended or adjusted under 35 U.S.C. 154(b) by 545 days.

(21) Appl. No.: 18/044,073

(22) PCT Filed: Nov. 3, 2021

(86) PCT No.: PCT/US2021/072220
§ 371 (c)(1),
(2) Date: Mar. 3, 2023

(87) PCT Pub. No.: WO2022/051780
PCT Pub. Date: Mar. 10, 2022

(65) Prior Publication Data
US 2023/0376114 A1 Nov. 23, 2023
Related U.S. Application Data

(60) Provisional application No. 63/075,080, filed on Sep. 4, 2020.

(51) Int. Cl.
*G06F 3/01* (2006.01)
(52) U.S. Cl.
CPC .................................... *G06F 3/015* (2013.01)
(58) Field of Classification Search
CPC ..... G06F 3/015; A61B 5/4812; A61B 5/4064; A61B 5/377; A61B 5/389; A61B 5/398
See application file for complete search history.

(56) References Cited

U.S. PATENT DOCUMENTS

| | | | |
|---|---|---|---|
| 5,507,716 A * | 4/1996 | LaBerge | ............... A61M 21/00 |
| | | | 600/27 |
| 6,270,466 B1 | 8/2001 | Weinstein et al. | |
| D709,673 S | 7/2014 | Aimone et al. | |
| 9,563,273 B2 | 2/2017 | Mann | |
| 9,764,110 B2 | 9/2017 | Larson et al. | |
| 9,820,670 B2 | 11/2017 | Parvizi et al. | |
| D824,523 S | 7/2018 | Paoli et al. | |

(Continued)

FOREIGN PATENT DOCUMENTS

| | | |
|---|---|---|
| CN | 110623665 A | 12/2019 |
| WO | 2016182974 A1 | 11/2016 |

(Continued)

OTHER PUBLICATIONS

International Search Report in PCT/US2021/072220 mailed on Feb. 3, 2022, 2 pages.

(Continued)

*Primary Examiner* — Charles R Kasenge
(74) *Attorney, Agent, or Firm* — METIS IP LLC

(57) ABSTRACT

The present disclosure relates to methods of human-computer interaction and the related interactive systems. In some cases, determination of certain brain states, as well as the detection of certain brain signals can be used to trigger operations conducted by the interactive system. In some other cases, detection of a transition from one brain state to another brain state can be used to trigger operations conducted by the interactive system.

11 Claims, 11 Drawing Sheets

(56) References Cited

U.S. PATENT DOCUMENTS

| | | | |
|---|---|---|---|
| 10,120,413 B2 | 11/2018 | Aimone et al. | |
| 10,203,758 B2 | 2/2019 | Björklund et al. | |
| 10,285,646 B1 | 5/2019 | Grant et al. | |
| 2007/0055169 A1 | 3/2007 | Lee et al. | |
| 2007/0249952 A1 | 10/2007 | Rubin et al. | |
| 2009/0082829 A1 | 3/2009 | Panken et al. | |
| 2010/0234697 A1 | 9/2010 | Walter et al. | |
| 2010/0234752 A1 | 9/2010 | Sullivan et al. | |
| 2014/0221779 A1* | 8/2014 | Schoonover | A61B 5/378 |
| | | | 600/27 |
| 2014/0343354 A1 | 11/2014 | Larson et al. | |
| 2015/0011857 A1 | 1/2015 | Henson et al. | |
| 2016/0317056 A1 | 11/2016 | Moon et al. | |
| 2017/0055868 A1 | 3/2017 | Hatakeyama | |
| 2017/0164903 A1 | 6/2017 | Soulet De Brugiere et al. | |
| 2017/0202476 A1 | 7/2017 | Desain et al. | |
| 2018/0081433 A1 | 3/2018 | Nandaragi | |
| 2018/0133431 A1 | 5/2018 | Malchano et al. | |
| 2018/0228394 A1* | 8/2018 | Tansey | A61B 5/369 |
| 2018/0236202 A1 | 8/2018 | Weiss et al. | |
| 2018/0361110 A1 | 12/2018 | Garcia Molina et al. | |
| 2019/0033914 A1 | 1/2019 | Aimone et al. | |
| 2019/0059790 A1 | 2/2019 | Yoshii | |
| 2019/0070386 A1 | 3/2019 | Raut et al. | |
| 2019/0142335 A1 | 5/2019 | Garcia Molina | |
| 2020/0008739 A1 | 1/2020 | Qian | |
| 2020/0170560 A1 | 6/2020 | Zakariaie et al. | |
| 2021/0259601 A1 | 8/2021 | Kornberg et al. | |

FOREIGN PATENT DOCUMENTS

| | | | | |
|---|---|---|---|---|
| WO | WO-2018051354 A1 * | 3/2018 | | A61N 1/205 |
| WO | 2020085553 A1 | 4/2020 | | |

OTHER PUBLICATIONS

Written Opinion in PCT/US2021/072220 mailed on Feb. 3, 2022, 5 pages.

* cited by examiner

210 — Monitoring bioelectrical signals from a subject

220 — Determining that the subject is in a reference brain state based on the bioelectrical signals 230 — Detecting one or more o-ERPs based on the bioelectrical signals 240 — Conducting an operation based on the reference brain state and the o-ERPs REM sleep,
indicated by strong
low-frequency bands Awake,
indicated by strong alpha band
(horizontal line around 9 Hz)

910 Monitor bioelectrical signals

920 REM sleep + o-ERPs

No

Yes

930 Play metronome sounds

940 REM sleep + Qualified o-ERPs

No

Yes

950 Trigger an audio menu with options presented in a sequence

960 REM sleep + Qualified o-ERPs

No

Yes

970 Trigger the corresponding operation

METHODS AND SYSTEMS FOR COMPUTER-HUMAN INTERACTIONS

CROSS-REFERENCE TO RELATED APPLICATIONS

This application is a US national stage application of PCT/US2021/072220 filed on Nov. 3, 2021, which claims priority to U.S. Provisional Patent Application No. 63/075, 080, filed on Sep. 4, 2020, the entire contents of which are hereby incorporated by reference.

TECHNICAL FIELD

The present disclosure relates to systems, methods, and devices that can be used in initiating, enhancing, modulating, improving, sustaining, and/or deepening human-computer interactions. Specifically, the systems, methods, and devices of the present disclosure achieve the goals related to human-computer interaction by collecting, processing, interpreting, and/or recording of bioelectrical signals from a subject.

BACKGROUND

Bioelectrical signals are generated by biological subjects and can be collected and processed. Such signals, and the patterns formed thereof, are being used to monitor, diagnose, and manipulate physiological and pathological conditions. Electroencephalogram (EEG), electromyogram (EMG), and electrooculogram (EOG) signals are some typical examples of bioelectrical signals.

In some instances, detecting, measuring, and processing bioelectrical signals could entail further interaction with the subject (e.g., a human subject). There are also limited occasions in which bioelectrical signals are used to understand and induce certain brain activities. However, the conventional systems and devices designed for these purposes are sometimes inefficient, or unreliable, or both. To improve human computer interactions, it is desirable to develop more systems, methods, and devices that utilize the bioelectrical signals.

SUMMARY

In one aspect, the present disclosure relates to a method of human-computer interaction, the method comprising: monitoring bioelectrical signals from a subject; determining that the subject is in a reference brain state based on the bioelectrical signals; detecting one or more ocular event-related potentials (o-ERPs) based on the bioelectrical signals, wherein the o-ERPs are results of the subject's voluntary action; and conducting an operation, with a computational device, based on the reference brain state and the o-ERPs.

In another aspect, the present disclosure relates to a method of human-computer interaction, the method comprising: continuously monitoring bioelectrical signals; and upon determining that the subject transitions from a reference brain state to a target brain state based on the bioelectrical signals, conducting an operation with a computational device.

In some embodiments, the present disclosure relates to a method of preparing a human-computer interaction, the method comprising: continuously monitoring bioelectrical signals from a subject's head, wherein the subject is asleep; and performing a calibration regimen, which includes: providing a reference signal to the subject; determining whether the subject transitions from a reference brain state to a target brain state based on the bioelectric signals; and if the subject does not transition to the target brain state, enhancing an action value of a controlled parameter of the reference signal and restarting the calibration regimen upon detection of the reference brain state again; and if the subject transitions to the target brain state, processing the action value of the parameter of the reference signal to determine a designated value of the parameter of the reference signals In some embodiments, the signals herein disclosed can include audio signals, visual signals, or mechanical signals, or a combination thereof.

In some embodiments, the brain state herein disclosed can be a non-lucid dream state, a lucid dream state, a wake state, a meditation state, a sleep state, a non-REM (nREM) to REM transition state, a rapid eye movement (REM) state, a tonic or phasic REM state, a non-REM state, a stage 1 of the nREM (N1) state, a stage 2 of the nREM (N2) state, a stage 3 of the nREM (N3) state, a hypnagogic state, a sleep paralysis state, a micro-awakening state, an increased arousal level state, or a recent wake-up state, or a combination thereof.

In one aspect, the present disclosure relates to induce lucid dream for the subject.

The present disclosure also relates to a system for human computer interaction, the system comprising: at least one storage medium including a set of instructions; and at least one processor in communication with the at least one storage medium, wherein when executing the set of instructions, the at least one processor is directed to perform the methods of the present disclosure.

The present disclosure also relates to a non-transitory computer readable medium, comprising executable instructions that, when executed by at least one processor, directs the at least one processor to perform the methods of the present disclosure.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The systems, methods, devices, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6A shows a general scheme of a calibration process; FIG. 6B shows a specific example of the calibration process.

FIG. 10A is an exemplary digital bioelectrical signal recording that demonstrates the change and bioelectrical signals, event logs, and interacting signals therein provided; FIGS. 10B-10D show exemplary bio-signal data that demonstrates a confirmation of voluntary response.

DETAILED DESCRIPTION

Figure 1:
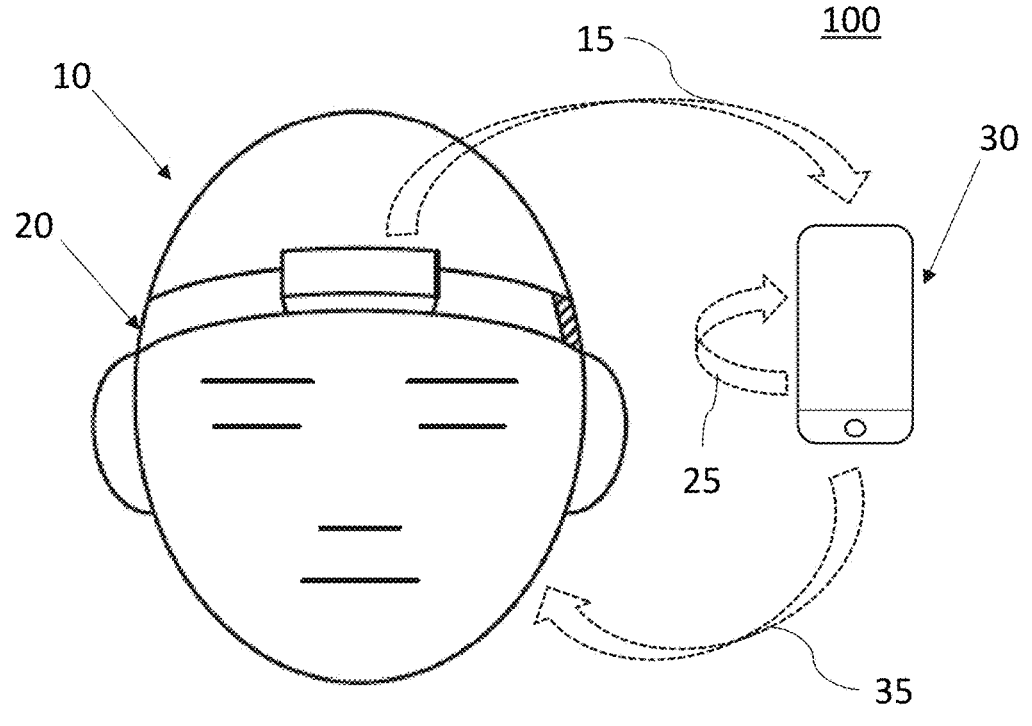
FIG. 1 shows a schematic diagram illustrating a human-computer interactive system according to certain embodiments of the present disclosure, in which an exemplary bioelectrical signal acquisition device is being worn on a subject's head.

In the following detailed description, numerous specific details are set forth by way of examples in order to provide a thorough understanding of the relevant teachings. However, it should be apparent to those skilled in the art that the present disclosure may be practiced without such details. In other instances, well known methods, procedures, systems, components, and/or circuitry have been described at a relatively high level, without detail, in order to avoid unnecessarily obscuring aspects of the present disclosure.

In addition, in the following detailed description, certain features are set forth when describing each group of embodiments (e.g., for embodiments associated with a particular Figure). However, it should be noted that such descriptions are not supposed to be limiting. Whenever reasonable to a person skilled in the art in view of the totality of the present disclosure, the description for certain features provided for some embodiments could be applied to other embodiments. The omission of such descriptions for the other embodiments are mostly due to the need to avoid redundancy. For example, when likely approaches are described for collecting, processing, and recording bioelectrical signals for the embodiments associated with FIG. 2, it would be reasonably understood by a person skilled in the art that such approaches would also be applicable to other embodiments of the present disclosure. There are many instances like this in the present disclosure.

In some embodiments, the present disclosure describes human-computer interactive systems, as well as methods for initiating, monitoring, recording, analyzing, modulating, and improving human-computer interactions. In some embodiments, the human-computer interactions are based, at least in part, on bioelectrical signals collected with a bioelectrical signal acquisition device. In addition, it should be noted that the systems, methods, and devices herein presented are not limited to be used in the interaction between computers and humans. As long as a living organism is capable of producing bioelectrical signals, it's interactions with computational devices can be covered by the embodiments of the present disclosure.

In some embodiments, the devices, systems, and methods herein described can be used in studying, analysis, and manipulation of physical conditions and functions. For example, the devices, systems, and methods herein described can be used to study and intervene with sleep, dream, and other cognitive functions, e.g., the functions associated with sleep, such as but not limited to sleep onset, sleep depth, sleep dynamics, dream, dream induction, memory consolidation, physical recovery, insomnia, sleep apnea, narcolepsy, hypersomnia, waking up, and abnormal sleep structure.

The systems, methods, and devices herein disclosed may also be used to study and modulate a subject's mental status, such as but not limited to anxiety, depression, attention deficiency, stress and meditation. The systems, methods, and devices herein disclosed may be convenient and effective tools to assess the effectiveness of sleep treatments, pharmaceutical, physical, cognitive or behavioral. They may also be used in neurofeedback to intervene and make adjustments based on the subject's neurological and mental conditions.

The systems, methods, and devices herein disclosed may be used to interact with the subject. They can be used as a two-way communication system allowing the subject in certain physiological conditions to communicate with a computational device, which refers to any device that is capable of information processing. For example, the systems, methods, and devices herein disclosed may be used collect, process, and/or record bioelectrical signals from the subject so that the subject can control a computational device to perform one or operations, such as but not limited to: providing further signals to the subject, changing parameters, adjusting output/signals, making selections, sending messages, and/or terminating an on-going operation.

The systems, methods, and devices herein disclosed may be used to interact with the subject when the subject provides voluntary signals in a specific brain state, including but not limited to: a wake state, a meditation state, a sleep state, a rapid eye movement (REM) state, a non-REM to REM transition state, a dream state, a lucid dream state, a hypnagogic state, a sleep paralysis state, a micro-awakening state, an increased arousal level state, or a recent wake-up state, or a transitioning state between any of two states thereof. In some embodiments, the systems, methods, and devices herein disclosed may be used to interact with the subject with the subject provides involuntary signals in a specific brain state, including but not limited to: a wake state, a meditation state, a sleep state, a rapid eye movement (REM) state, a non-REM (nREM) state, a nREM to REM transition state, a stage 1 of the nREM (N1) state, a stage 2 of the nREM (N2) state, a stage 3 of the nREM (N3) state, a dream state, a non-lucid dream state, a lucid dream state, a hypnagogic state, a sleep paralysis state, a micro-awakening state, an increased arousal level state, or a recent wake-up state, or a transitioning state between any of two states thereof.

The systems, methods, and devices herein disclosed may be used to interact with the subject, at least in part, by collecting, processing, and/or recording bioelectrical signals that are provided by the subject voluntarily or involuntarily. Herein, voluntary actions refer to actions or behavior conducted, done, or undertaken by the subject's free choice, own accord, or intentions. For example, in a wake state, the subject can undertake voluntary action (e.g., sending out signals). In addition, in some brain states when the subject is not fully functional, he/she may still be able to take voluntary actions. For example, in a dream state (e.g., lucid dream state), in a hypnagogic state, in certain medical-induce sedative states, or in pseudo-coma, such as in "locked-in syndrome", the subject may still be able to send signals voluntarily. The signals from the subject can take various forms. In some embodiments, the signals may be provided with specific eye movements, which can result in o-ERPs that can be collected, processed, and/or recorded, thereby allowing effective interaction with entities (e.g., a computational device) other than the subject.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood that the operations of the flowchart may be implemented not in order. Conversely, the operations may be implemented in inverted order, or simultaneously. Moreover, one or more other operations may be added to the flowcharts. One or more operations may be removed from the flowcharts.

In the present disclosure, the term "bioelectrical signal" refers to electric signals produced by biological beings, such as but not limited to plants and animals. In some embodiments, the bioelectrical signals of the present disclosure are produced by a human.

In the present disclosure, the term "subject" refers to a living being that uses, wears, or is monitored by the bioelectrical signal acquisition device and/or the interactive system of the present disclosure. Here "using" means wearing and/or being tested, monitored or analyzed. In some embodiments, the subject is a human being. In some embodiments, the subject is an animal other than a human being. In some embodiments, the bioelectrical signal acquisition device is configured to be worn on the subject's head. In some embodiments, the bioelectrical signal acquisition device is configured to be worn on other body parts, such as but not limited to chest, leg, foot, arm, hand, neck, shoulder, hip, and back. In some embodiments, the subject is a male or a female. In some embodiments, the subject is a newborn, an infant, a toddler, a child, a teenager, a young adult, an adult, or a senior.

In the present disclosure, the term "sleep" or "asleep" refers to a condition of body and mind such as that which typically recurs for several hours every night, in which the nervous system is relatively inactive, the eyes closed, the postural muscles relaxed, and consciousness practically suspended. The devices, systems, and methods of the present disclosure can be used for initiating, monitoring, recording, analyzing, modulating, and improving the interaction between the subject and a computational device when the subject is sleeping or in a sleep-related stage. In certain embodiments, the subject is preparing to fall asleep. In certain embodiments, the subject is asleep. In certain embodiments, the subject is waking up from sleep. In certain embodiments, the subject is experiencing different stages of sleeping, including but not limited to stage 1 sleep, stage 2 sleep, stage 3 sleep, and rapid eye movement (REM) sleep, a non-lucid dream state, a lucid dream state, a hypnagogic state, a sleep paralysis state, a micro-awakening state, an increased arousal level state, or a recent wake-up state. In certain embodiments, the subject is in a transitioning state between any of the two states. In certain embodiments, the subject is in an awake stage (e.g., wake up time in the morning) immediately after a period of sleep. In certain embodiments, the subject is in an awake stage between two close periods of sleep. In some embodiments, the subject goes through a duration that combines some or all of the stages related to sleep.

FIG. 1 shows a schematic diagram illustrating a human-computer interactive system 100 according to certain embodiments of the present disclosure, in which an exemplary bioelectrical signal acquisition device 20 is being worn on a subject's head 10. In some embodiments, the interactive system 100 comprises a bioelectrical signal acquisition device 20 and a computational device 30. The bioelectrical signal acquisition device 20 is communicable with the computational device 30, which is configured to process the signals collected by the bioelectrical signal acquisition device 20 and provide signals in one or more forms to the subject.

While FIG. 1 shows that the bioelectrical signal acquisition device 20 is a headband worn by the subject on the subject's head, it should be noted that the components and their format and positioning shown in FIG. 1 are demonstrative only, not meant to be limiting. For example, for the inventions herein disclosed, the bioelectrical signal acquisition device 20 can be any device that is capable of collecting bioelectrical signals from any body part of a subject. the bioelectrical signals may also be collected from body parts other than the subject's head. In certain embodiments, the bioelectrical signals may be collected by any kinds of intelligent wearable devices such as but not limited to cuffs, wristbands, wristwatches, or neckbands.

In some embodiments, the bioelectrical signal acquisition device 20 can be the device disclosed in U.S. Pat. App. Pub. No. 20200008739, the contents of which are herein incorporated by reference in their entirety.

The computational device 30 may be any device that have a computational capacity. For example, the computational device 30 may be a smart phone, a tablet computer, a laptop computer, a desktop computer, a wearable intelligent device, a virtual reality (VR) device, an augmented reality (AR) device, a microcontroller, a server, or a cloud-based processing center.

Despite what is shown directly in FIG. 1, it is not required that the bioelectrical signal acquisition device 20 and the computational device 30 be separate devices. In some embodiments, the computational device 30 and the bioelectrical signal acquisition device can be integrated, either physically or functionally.

The dotted arrows 15, 25, and 35 in FIG. 1 indicate the flows of information and/or signals. For example, flow 15 indicates the transmission of information, wirelessly or by wire, from the bioelectrical signal acquisition device 20 to the computational device 30. In certain embodiments, the bioelectrical signals can be collected by the bioelectrical signal acquisition device 20, preliminarily processed (e.g., converting analog to digital data), and the signals are then transmitted, via flow 15, to the computational device 30. Flow 25 indicates information transfers within the computational device 30. For example, after receiving the bioelectrical signals, the computational device 30 may process the bioelectrical signals by analyzing frequency, timing, and identifying features and patterns. Flow 35 indicates information, often in the form of interacting or stimulating signals, provided by the computational device 30 and to the subject 10. For example, the computational device 30 may provide audio signals, visual signals, or mechanical signals, or a combination thereof, to the subject 10, possibly eliciting a response from the subject 10 or stimulating the subject 10 and resulting in certain changes (e.g., transitioning from one brain state to another brain state).

Figure 2:
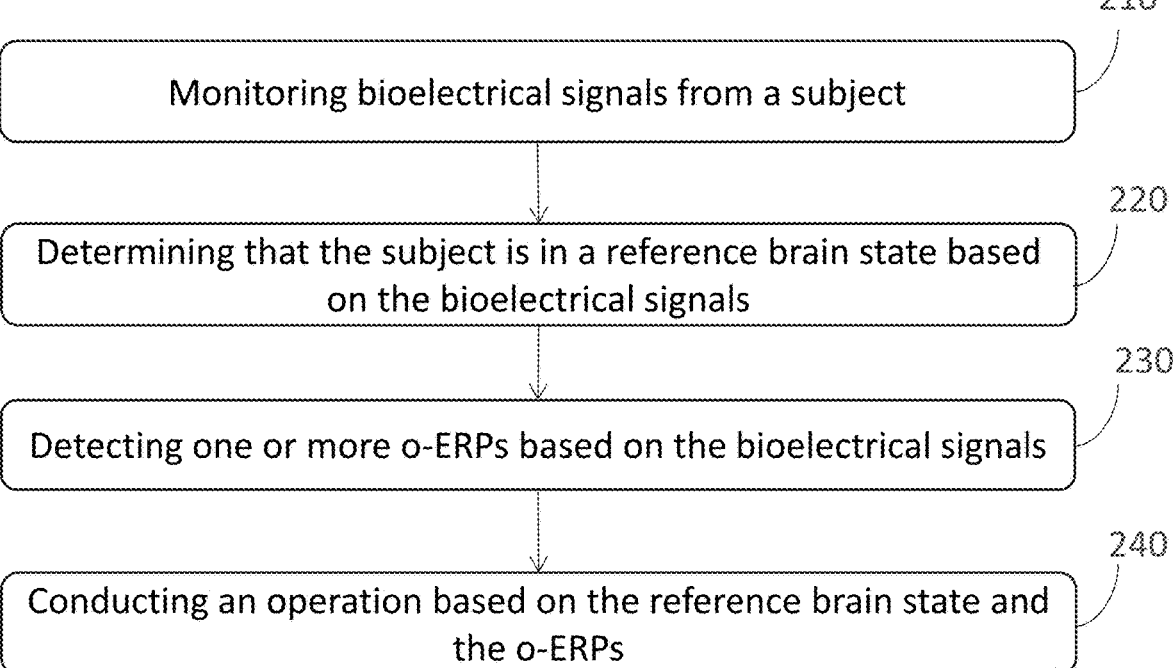
FIG. 2 is a flowchart illustrating an exemplary process for human-computer interaction according to some embodiments of the present disclosure.

FIG. 2 is a flowchart illustrating an exemplary process for human-computer interaction according to some embodiments of the present disclosure.

As shown in operation 210 of the process illustrated in FIG. 2, the interactive system of the present disclosure can be used to monitor bioelectrical signals from a subject. In some embodiments, the monitoring of the bioelectrical signals refers to the collecting, processing, and/or recording of the bioelectrical signals by a device that is configured for such tasks. For example, the monitoring can be conducted by the bioelectrical signal acquisition device 20 shown in FIG. 1. In some embodiments, the bioelectrical signals from the subject's head are monitored, e.g., with the bioelectrical signal acquisition device 20. In some embodiments, the bioelectrical signals from other body parts of the subject may be monitored.

In some embodiments, especially when the bioelectrical signals from the subject's head are monitored, the bioelectrical signals may comprise electroencephalogram (EEG), electromyogram (EMG), and/or Electrooculogram (EOG) signals of the subject. In some embodiments, the bioelectrical signals comprise primarily EEG signals of the subject. In some embodiments, the bioelectrical signals comprise primarily EEG and EOG signals of the subject. In some embodiments, the bioelectrical signals comprise signals from the subject when the subject sleeps, prepares to fall asleep, or just wakes up. In some embodiments, the bioelectrical signals comprise signals from the subject when the subject is awake. In some embodiments, the bioelectrical signals comprise signals from the subject when the subject is meditating.

In some embodiments, the bioelectrical signals are monitored continuously, which indicates that the monitoring does not cease until there is a specific operation or instruction to terminate. In certain embodiments, the monitoring would continue without regard to the transitioning of brain states or the on or off of signaling to the subject. In some embodiments, the monitoring of the bioelectrical signals is not continuous, i.e., being conducted only when a specific triggering event occurs or when a specific instruction is given, and being terminated automatically when the triggering event ceases or according to the instruction.

As shown in operation 220 of the process illustrated in FIG. 2, the interactive system of the present disclosure can be used to determine that the subject is in a reference brain state based on the bioelectrical signals.

In some embodiments, the reference brain state may be a wake state, a sleep state, a meditation state, a rapid eye movement (REM) state, a non-REM (nREM) state, a stage 1 of the nREM (N1) state, a stage 2 of the nREM (N2) state, a stage 3 of the nREM (N3) state, a dream state, a lucid dream state, a hypnagogic state, a sleep paralysis state, a micro-awakening state, an increased arousal level state, or a recent wake-up state, or a transitioning state between any of two states thereof. In some embodiments, the reference brain state may be a wake state, a meditation state, a sleep state, an REM state, an nREM to REM transition state, a dream state, a lucid dream state, a hypnagogic state, a sleep paralysis state, a micro-awakening state, an increased arousal level state, or a recent wake-up state, or a transitioning state between any of two states thereof. In some embodiments, the reference brain state may be an REM state, an nREM to REM transition state, or a lucid dream state.

In some embodiments, the reference brain state may be a state in which the subject is capable of providing a voluntary response to signals such as but not limited to audio (including voice) signals, visual signals, mechanical signals, or a combination thereof.

In some embodiments, being in the reference brain state is a prerequisite for further actions, i.e., the interactive system would only conduct further operations when it is determined that the subject is in the reference brain state. In some embodiments, the interactive system may conduct further operations based on other conditions, regardless of whether the subject is in the reference brain state.

As shown in operation 230 of the process illustrated in FIG. 2, the interactive system of the present disclosure can be used to detect one or more ocular event-related potentials (o-ERPs) based on the bioelectrical signals. In some embodiments, the o-ERP can be detected by processing the bioelectrical signals collected by the bioelectrical signal acquisition device 20.

In some embodiments, detecting the o-ERPs refers to determining that one or more o-ERPs exist. In some embodiments, detecting the o-ERPs refers to identifying the existence and pattern of the o-ERPs. In some embodiments, detecting the o-ERPs refers to determining that one or more o-ERPs exist and that the o-ERPs fit a pre-set format (time and pattern) or a format agreed to by the subject, or that the o-ERPs are consistent with interacting signals provided to the subject (e.g., the interacting signals are a sequence of monotones, and the o-ERPs are also a sequence generally in sync but following the interacting signals). In certain embodiments, the common patterns of the o-ERPs include but not limited to single o-ERP, an o-ERP pair, or a sequence of o-ERPs (equal to or more than 3).

In some embodiments, the o-ERPs result from actions such as but limited to eye blinking, eye movement (including eye rolling), or eyelid squeezing, or any combination thereof, by the subject. One example to use o-ERPs: when the subject is in meditation, the subject may use eye movements, eye blinks, or eyelid squeezes to generate o-ERPs, so that the computational device may conduct an operation, such as adding a log entry and/or event mark.

In some embodiments, the o-ERPs are the results of the subject's voluntary actions. In some embodiments, the o-ERPs are only produced involuntarily by the subject. In certain brain states, the subject is able to voluntarily perform certain actions that may result in o-ERPs. For example, when the subject is awake, in meditation, or in a sleep-to-wake transition state, the subject may be able to intentionally squeeze eyelids or move his/her eyes, thereby voluntarily produce one or more o-ERPs. As another example, when the subject is asleep, if the subject is in an REM state, the subject may be able to intentionally squeeze or move his/her eyes, thereby voluntarily produce one or more o-ERPs. Patterns can be created by specific movements. For example, the subject may intentionally move his/her eyes by change his/her gazing directions, such as looking to the left, then looking to the right, in the dream world, to create a left-right-repeat pattern. In certain embodiments, the o-ERPs are produced by the voluntary actions (e.g., eye blinking, eye movement, or eyelid squeezing) of the subject when the subject is in a lucid dream state. Such brain states in which the subject may be able to voluntarily produce one or more o-ERPs include but are not limited to: a wake state, a meditation state, a sleep state, an REM state, an nREM to REM transition state, a dream state, a lucid dream state, a hypnagogic state, a sleep paralysis state, a micro-awakening state, an increased arousal level state, or a recent wake-up state, or a transitioning state between any of two states thereof.

In some embodiments, the o-ERPs are responses to interacting signals provided (e.g., transmitted, sent, played) to the subject. In certain embodiments, such responses are the results of the subject's voluntary actions. The interacting signals may be provided by the bioelectrical signal acquisition device, by a separate computational device, or by a combined device. In some embodiments, the interacting signals may be considered initiation signals that are used to initiate a human-computer interaction. For example, when the interactive system determines that the subject is in a predetermined reference brain state (e.g., wake, meditating, REM, or nREM to REM transition), the computational device may send interacting signals to the subject, e.g., asking the subject to confirm that he/she is in the predetermined reference brain state, or inquiring where the subject wants to start an interacting process; if the subject responds by providing o-ERPs that are consistent with a pre-determined format (e.g., timing, number, and/or pattern), then the interactive system may conduct an operation as indicated in 240 below.

In some embodiments, the o-ERPs are initiated by the subject, without immediate prompting or without receiving any interacting signals right before the o-ERPs are produced. For example, the subject may agree beforehand to take certain actions (e.g., to produce o-ERPs) when the subject is in a certain brain state (e.g., wake, meditating, or lucid dream). The subject may also agree beforehand as to the specific actions that need to be taken (e.g., eye movement or eye squeeze for a number of times) to produce the o-ERPs. Furthermore, take lucid dream state as an example, when the subject realizes that he/she is having a lucid dream, the subject may take voluntary actions (e.g., eye movement or changing gaze for a number of times) that may result in one or more o-ERPs, which can be detected by the interactive system of the present disclosure. The interactive system may then conduct an operation, e.g., as indicated in 240 below.

As shown in operation 240 of the process illustrated in FIG. 2, the interactive system of the present disclosure can be used to conduct an operation based on the reference brain state and the o-ERPs.

In some embodiments, when the interactive system determines that the subject is in the reference brain state and/or determines that one or more o-ERPs exist, and/or that the o-ERPs fit a pre-determined pattern, the interactive system may conduct certain operations with or without additional input. The subject being in the reference brain state, and/or the detection of the one or more o-ERPs, essentially serve as a trigger to the operation. In certain embodiments, no additional input is needed; and the interactive system may conduct the operation automatically, based on essentially the bioelectrical signals, from which the reference brain state and the o-ERPs can be extracted. In certain embodiments, some additional input is needed, e.g., the interactive system may need a confirmation to proceed to conduct the operation.

In some embodiments, the operation may be conducted with the computational device. For example, when the interactive system determines that the subject is in the reference brain state and detects the o-ERPs, the computational device may conduct operations such as but not be limited to: providing further signals to the subject (e.g., with the computational device); adjusting a parameter associated with an output (e.g., signals provided by the computational device), adding a log record (e.g., to the record stored in the computational device), sending a message (e.g., from the computational device), updating a social network status (e.g., lucid dream status of a person associated with the computational device), turning on camera (e.g., camera associated with the computational device), or activating a menu (e.g., functional menu with multiple selections associated with the computational device).

In certain embodiments, such operation involves only the computational device, but not the subject. Take lucid dream state as an example, the interactive system may determine that the subject is in a lucid dream state, e.g., by combining that the subject is in REM and that the subject sends a voluntary o-ERP, with or without prompting by signals; the computational device may take a note (update log) that the subject is in a lucid dream state. In certain embodiments, such operation only involves the computational device. In certain embodiments, such operation involves the computational device and another entity.

In some embodiments, the interactive system of the present disclosure may conduct an operation that further involves the subject. For example, the interactive system may send further signals to the subject, initiating an interaction or providing stimulation to the subject. For example, the interactive system may determine that the subject is in a lucid dream state (as indicated above), the interactive system may send further signals (e.g., audio, visual, mechanical, or a combination) to the subject, with the intention of eliciting additional responses (e.g., in the form of o-ERPs) from the subject. The interaction and/or stimulation processes are illustrated by various examples below in more detail.

In some embodiments, based on the reference brain state and the detection of the o-ERPs, the interactive system may conduct a plurality of operations. In certain embodiments, the plurality of operations may include all types of operations that involve different entities. For example, the plurality of operations may include an operation that involves only the computational device, an operation that involves the computational device and the subject, and/or an operation that involves the computational device and a different entity. Still referring to the lucid dream examples above, the computational device may add a log record, send a message, provide further signals to the subject, receive a message, and/or present the message-associated signals to the subject following pre-determined rules.

Figure 3:
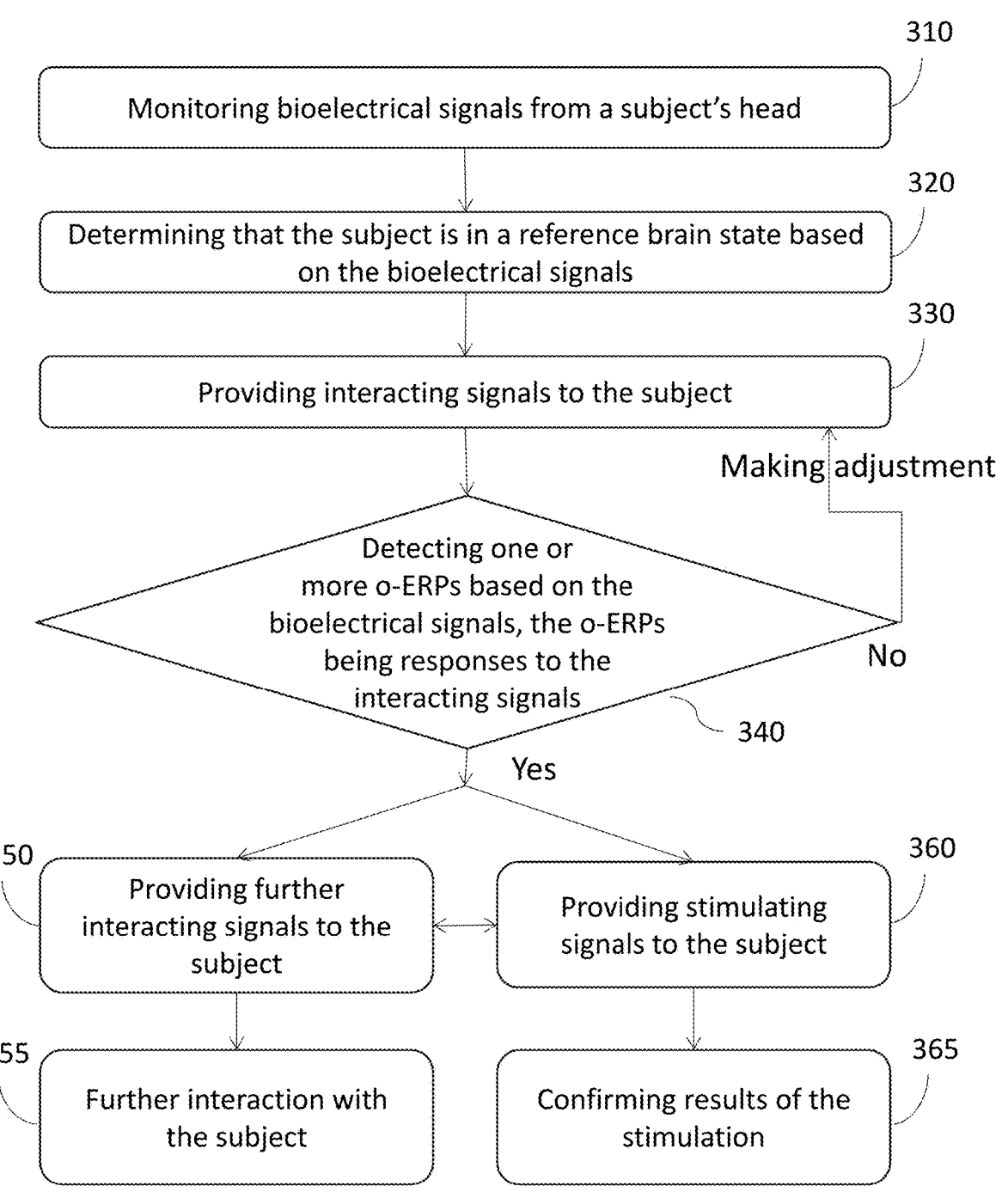
FIG. 3 is a flowchart illustrating an exemplary process for human-computer interaction according to some embodiments of the present disclosure, providing additional/alternative details to the embodiments shown in FIG. 2.

FIG. 3 is a flowchart illustrating an exemplary process for human-computer interaction according to some embodiments of the present disclosure, providing additional/alternative details to the embodiments shown in FIG. 2.

As shown in operation 310 of the process illustrated in FIG. 3, the interactive system of the present disclosure can be used to monitor bioelectrical signals from a subject's head. As shown in operation 320 of the process illustrated in FIG. 3, the interactive system of the present disclosure can be used to determine that the subject is a reference brain state based on the bioelectrical signals.

As shown in operation 330 of the process illustrated in FIG. 3, the interactive system of the present disclosure can be used to provide interacting signals to the subject. In some embodiments, the interacting signals are provided with the intention to elicit a response from the subject. In some embodiments, the interaction signals are provided only when the interactive system determines that the confirms that the subject is in the reference brain state, because in certain occasions it would be impossible or difficult to elicit a response (e.g., a voluntary response) from the subject unless the subject is in the reference brain state. For example, when the subject is asleep, it would be impossible and/or difficult to elicit a voluntary response from the subject unless the subject is in a lucid dream state.

In some embodiments, the interacting signals can be provided by the bioelectrical signal acquisition device, the computational device, or a combined device. In some embodiments, the interacting signals may be provided by a device that generally not considered part of the interactive system.

The interacting signals may take any form that may notify, alert, remind, provoke, and/or inform the subject. In some embodiments, the interacting signals include audio signals, visual signals, mechanical signals, temperature signals, or electric signals, or a combination thereof. In certain embodiments, the interacting signals may include audio signals (e.g., voice instruction, beats, repeated or rhythmic sound, alarm, music, or user-defined audio track, etc), visual signals (e.g., displayed text or images, light, or flashes, screen brightness change, screen color change, flash light activation, presentation of messages, or choices in text or images, etc), or mechanical signals (e.g., vibration, touching, pressing, vibration of the computational device, or vibration of an accessory device/component controlled by the computational device, etc), temperature signals (e.g., increasing or decreasing temperature), or electric signals, or a combination thereof. In certain embodiments, the interacting signals are audio signals that includes voice signals.

In some embodiments, the interacting signals have a controlled parameter with an initiation value. For example, the interacting signals may be audio signals, the controlled parameter may be audio volume, and the initiation value may be 40 decibels. In certain embodiments, the initiation value of the controlled parameter may be determined by a calibration regimen, which is described in more details as related to FIG. 6. In some embodiments, the controlled parameter and initiation value are designed to elicit a pre-determined response (e.g., voluntary o-ERPs), but not to result in unintended consequences (e.g., driving the subject to an undesired brain state such as being awake). However, in some cases, it is still possible that the interacting signals having the controlled parameter with the initiation value would not elicit a response. As indicated below, the value of the controlled parameter may be adjusted so as to facilitate response elicitation.

As shown in operation 340 of the process illustrated in FIG. 3, the interactive system of the present disclosure can be used to detect one or more o-ERPs based on the bioelectrical signals. In some embodiments, the o-ERPs are responses to the to interacting signals.

If the o-ERPs are successfully detected (i.e., the bioelectrical signals show that the o-ERPs exist and the format of the o-ERP fits a pre-determined format), the process shown in FIG. 3 then proceeds. If the o-ERP detection is unsuccessful, adjustments are made to the interacting signals. The process then revert back to operation 330, and the interacting signals are provided again. The 330-340-330 loop may take place multiple times, when the o-ERPs are detected, when the subject is no longer in the reference brain state, or when the subject transitions to an undesired brain state.

As an example, when the interactive system determines that the subject is in REM, the interactive system may play audio (e.g., including voice) signals to the subject at a sound volume of 40 decibels; when the interactive system cannot detect o-ERPs, the volume of the audio signals is then adjusted (e.g., increasing the volume to 42 decibels), and the audio signals are played again. This process would repeat one or more times, until when the o-ERPs are detected, or when the subject is no longer in the REM state, or when the subject wakes up.

It should be noted that the audio volume is used only as an example of controlled parameter, not as a limiting factor. For example, frequency or contents of music or voice of audio, pattern, brightness, color, or picture of visual signals, frequency or pressure of mechanical signals, of the interacting signals may be changed. In fact, as long as the parameter can alter the effectiveness of the interacting signals to elicit a response, the parameter can be a controlled parameter.

As shown in operations 350 and 360 of the process illustrated in FIG. 3, the interactive system of the present disclosure can be used to provide further signals to the subject. In some embodiments, as shown in operation 350, the further signals are further interacting signals that are used to further interact with the subject. In some embodiments, as shown in operation 360, the further signals are stimulating signals that are used to elicit certain changes to the subject (e.g., prompt the subject to transition to a specific brain state).

As the interacting signals, the further signals can include audio signals, visual signals, mechanical signals, temperature signals, or electric signals, or a combination thereof. In certain embodiments, the further signals may include audio signals (e.g., voice instruction, beats, repeated or rhythmic sound, alarm, music, or user-defined audio track, etc), visual signals (e.g., displayed text or images, light, or flashes, screen brightness change, screen color change, flash light activation, presentation of messages, or choices in text or images, etc), or mechanical signals (e.g., vibration, touching, pressing, vibration of the computational device, or vibration of an accessory device/component controlled by the computational device, etc), or temperature signals, or electric signals, or a combination thereof. In certain embodiments, the further signals are audio signals that includes voice signals.

As shown in operation 355 of the process illustrated in FIG. 3, the interactive system of the present disclosure can be used to conduct further interaction with the subject. The further interaction may be carried out by a two-way communication: the interactive system providing signals to the subject; the subject responds to the signals provided by the interactive system in the form of bioelectrical signals (e.g., o-ERPs). More details of possible interactions are provided below.

As shown in operation 365 of the process illustrated in FIG. 3, the interactive system of the present disclosure can be used to confirm the results of the stimulation by the stimulating signals. The confirmation can be achieved by monitoring the bioelectrical signals, or by other means, such as but not be limited to: direct observation of the subject, measuring other parameters of the subject, or communication with the subject.

In some embodiments, the further interacting signals may include a signal template (e.g., an audio template) that include repeated or rhythmic signals. For example, the interacting signals may be a description or instruction that includes a signal template. The subject can follow predetermined or real-time explanations and utilize the audio template as basis for input (e.g., by blinking, squeezing eyelid, making eye movement, etc.), thus forming patterns to make a choice or convey certain meanings. In some embodiments, such patterns may take the form of a binary sequence. For example, in certain embodiments, the patterns can be sequences defined in Morse code, since it is a well-known binary sequence representing English alphabets. In certain scenarios, especially when there is a high noise level in the data acquired by the bioelectrical signal acquisition device, it may be easier (i.e., with higher identification accuracy) to detect bioelectrical signals (e.g., o-ERPs) with patterns (e.g., following instructions and based on a signal template) than a single input signal.

In some embodiments, the method of human-computer interaction may include a presentation of one or more questions/prompts and list of choices for the upcoming interactions. In some embodiments, the method of human-computer interaction may include a presentation of multiple-choice questions/prompts and list of choices for the upcoming interactions. Such questions/prompts and choices can be presented in various ways, examples of which are shown below. In some embodiments, the signal sequence may include one or more steps of conditional choices. In some embodiments, one step of the conditional choices may include a binary-choice conditional branch, which is triggered by a presence of a detected o-ERP during a predetermined time period. In some embodiments, one step of the conditional choices may include a multiple-choice conditional branch, which is triggered by two or more detected o-ERPs during a pre-determined time period. In some embodiments, the method of human-computer interaction may include eliciting a response from the subject. In some embodiments, the method of human-computer interaction may include presenting (e.g., send audio instructions) information to the subject on how to provide a response. In some embodiments, the method of human-computer interaction may include presenting (e.g., send audio instructions) information to the subject on how to make a selection among the choices presented to the subject.

It should be noted that although 350-355 and 360-365 are shown as separate paths, they are fundamentally related, and can be mixed and/or performed one after the other. In essence, the further interacting signals and the stimulating signals are all signals provided after determining that the subject is in the reference brain state, and after o-ERPs have been detected; they are substantively similar, but with different purposes. It would be possible that the stimulating signals fail to prompt the subject into a new brain state but succeed in eliciting a response from the subject. It would also be possible for the interacting signals to have such reverse effects. In addition, it is possible that the interactive system provides further interacting signals first to communicate with the subject, and then provides stimulating signals to the subject. On the other hand, it is possible that the interactive system provides stimulating signals to the subject to prompt the subject into a new brain state (e.g., waking up the subject, or induce lucid dream), and then provide further interacting signals to the subject for further communication.

Figure 4:
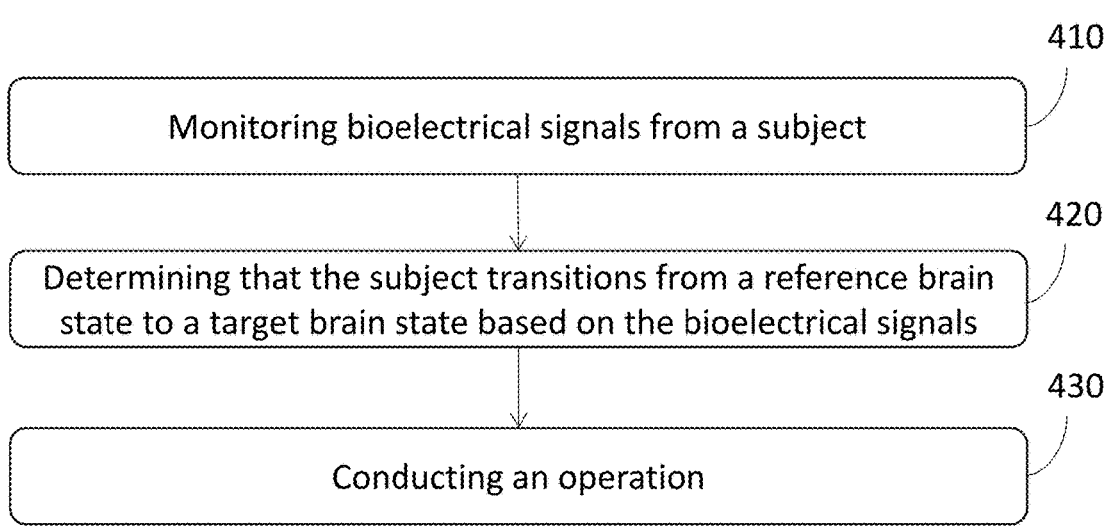
FIG. 4 is a flowchart illustrating an exemplary process for human-computer interaction according to some embodiments of the present disclosure.

FIG. 4 is a flowchart illustrating an exemplary process for human-computer interaction according to some embodiments of the present disclosure.

As shown in operation 410 of the process illustrated in FIG. 4, the interactive system of the present disclosure can be used to monitor bioelectrical signals from a subject. As discussed for operation 210 in FIGS. 2 and 310 in FIG. 3, the bioelectrical signal acquisition device may be used to monitor the bioelectrical signals (e.g., bioelectrical signals from the subject's head). More details can be found in the descriptions for the operations in FIGS. 2 and 3.

As shown in operation 420 of the process illustrated in FIG. 4, the interactive system of the present disclosure can be used to determine that the subject transitions from a reference brain state to a target brain state based on the bioelectrical signals.

In some embodiments, the reference brain state can be: a non-lucid dream state, a lucid dream state, a wake state, a meditation state, a sleep state, a non-REM (nREM) to REM transition state, a rapid eye movement (REM) state, a tonic or phasic REM state, a non-REM state, a stage 1 of the nREM (N1) state, a stage 2 of the nREM (N2) state, a stage 3 of the nREM (N3) state, a hypnagogic state, a sleep paralysis state, a micro-awakening state, an increased arousal level state, or a recent wake-up state, or a combination thereof.

In some embodiments, the target brain state can be: a non-lucid dream state, a lucid dream state, a wake state, a meditation state, a sleep state, a non-REM (nREM) to REM transition state, a rapid eye movement (REM) state, a tonic or phasic REM state, a non-REM state, a stage 1 of the nREM (N1) state, a stage 2 of the nREM (N2) state, a stage 3 of the nREM (N3) state, a hypnagogic state, a sleep paralysis state, a micro-awakening state, an increased arousal level state, or a recent wake-up state, or a combination thereof.

It is noted that some brain states herein listed overlaps with each other, e.g., the sleep state includes the REM state. Therefore, when a transition from one brain state to another brain state is herein discussed, the two brain states do not overlap, e.g., possible to transition from sleep state to wake state, or from REM state to wake state, but no transition from sleep state to REM state.

As shown in operation 430 of the process illustrated in FIG. 4, the interactive system of the present disclosure can be used to conduct an operation based on the determination that the subject transitions from the reference brain state to the target brain state. The operation that can be conducted includes various types and combinations. Some examples of the operation in 430 of FIG. 4 are described for the operations in 240 of FIG. 2, and 330, 350, 355, 360, and 365 of FIG. 3. Additional details for the possible operations are provided below. In the embodiments associated with FIG. 4, essentially the transition from the reference brain state to the target brain state constitute a triggering event, resulting in conducting the operation indicated in 430.

Here are some examples of the brain state transition-triggered operations: (1) when a transition from a sleep state to a wake state is detected, the interactive system may silence the alarm that just elicited the wake state; this approach can be beneficial in some cases because sometimes the transition is not clearly observable; (2) when a transition from a sleep state to a wake state is detected, the interactive system may complete a volume calibration process (more details in descriptions for FIG. 6); (3) when a transition from a wake state to a sleep state is detected, the interactive system may stop a sleep induction regimen that induced the sleep state; (4) when a transition from a wake state to a sleep state is detected, the interactive system may start to play audio cue to induce lucid dream (more details in descriptions for FIGS. 7A and 7B); (5) when a transition from a nREM state to an REM state is detected, the interactive system may play audio cue to induce lucid dream; (6) when a transition from a hypnagogic state to another state (any state other than the hypnagogic state) is detected, the interactive system may wake up the subject to record ideas. In some embodiments, the interactive system may automatically conduct the operations without additional input or approval.

It should also be noted that "reference brain state" and "target brain state" are relative terms that are not absolute in their meaning. A "target brain state" in one process may be the "reference brain state" in another process when the two processes are sequentially arranged, and vice versa. For example, if the process shown in FIG. 4 is to be combined with the process in FIG. 2, wherein a transition from the "reference brain state" to "target brain state", as defined in FIG. 4, would be used to trigger the operation 220 in FIG. 2, then it would be reasonably understood that the "target brain state" in FIG. 4 would be the "reference brain state" in FIG. 2. In addition, in a similar manner, there might be two (or more) "reference brain states" or "target brain states" when each process is arranged more than once.

The combination of the "transition triggering" process and the "brain state+o-ERP" process can be employed in multiple embodiments. For example, in certain embodiments, the o-ERP detection can be used as a confirmation to the brain state transition. Such examples may include but not limited to: (1) when a transition from a sleep state to a wake state is detected, before conducting further operations, the interactive system may use o-ERP detection to confirm the transition; (2) when a transition from a nREM state to a REM state is detected, before conducting further operations, the interactive system may use o-ERP detection to confirm the transition. In some cases, the o-ERPs produced by the subject may be un-prompted because the subject has agreed beforehand to use eye movements, eye squeezes, or eye blinks to confirm transition to the new brain state (e.g., wake state, REM state). In some cases, the interactive system would employ signals such as audio cues to prompt the subject to use eye movements, eye squeezes, or eye blinks to confirm transition to the new brain state (e.g., wake state, REM state).

Figure 5:
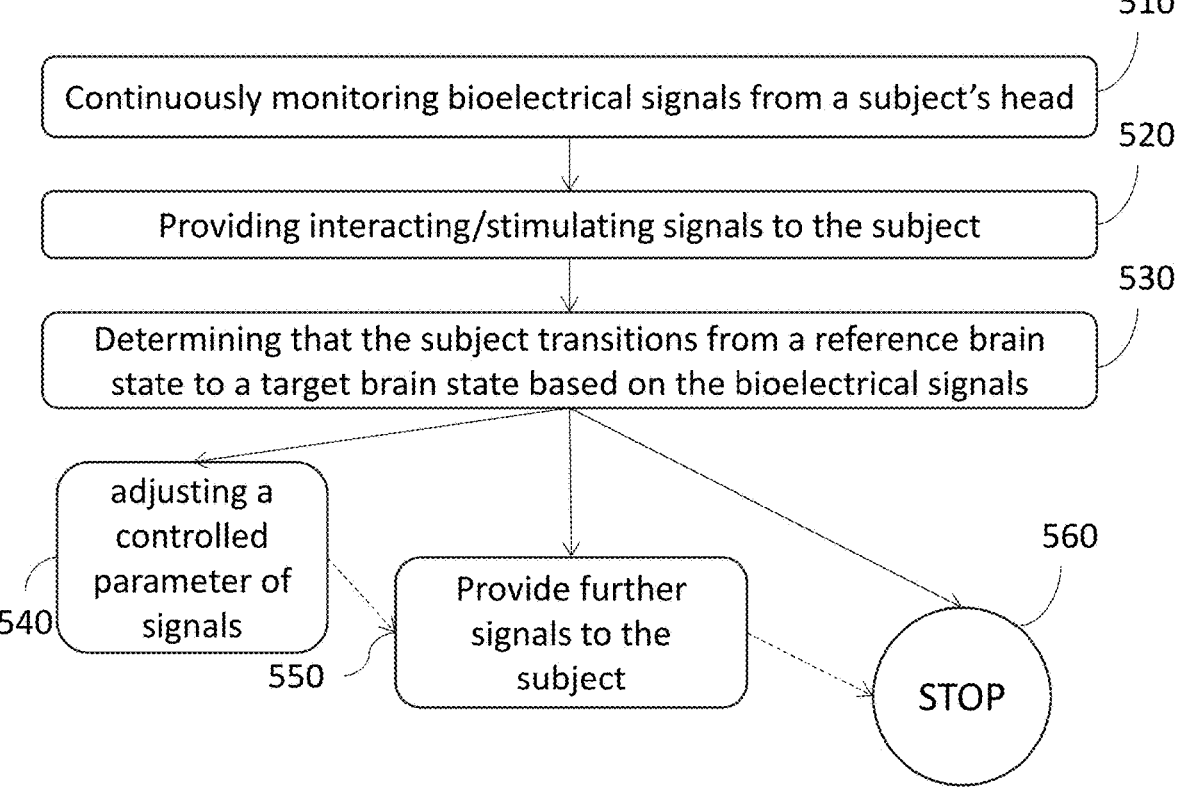
FIG. 5 is a flowchart illustrating an exemplary process for human-computer interaction according to some embodiments of the present disclosure, providing additional/alternative details to the embodiments shown in FIG. 4.

FIG. 5 is a flowchart illustrating an exemplary process for human-computer interaction according to some embodiments of the present disclosure, providing additional/alternative details to the embodiments shown in FIG. 4.

As shown in operation 510 of the process illustrated in FIG. 5, the interactive system of the present disclosure can be used to continuously monitor bioelectrical signals from a subject's head. Such monitoring can be carried out as described for operations 210 of FIG. 2, 310 of FIG. 3, and 410 of FIG. 4.

As shown in operation 520 of the process illustrated in FIG. 5, the interactive system of the present disclosure can be used to provide interacting and/or stimulating signals to the subject. Some examples and descriptions of the interacting signals and/or stimulating signals are provided in the descriptions related to operations 330, 350, 355, 360, and 365 of FIG. 3. In essence, the interacting/stimulating signals can be used to elicit responses from the subject or induce a new brain state. In certain embodiments, the transition from the reference brain state to the target brain state is induced by the stimulating signals (or interacting signals). In certain embodiments, the transition from the reference brain state to the target brain state happens naturally, without any induction.

As shown in operation 530 of the process illustrated in FIG. 5, the interactive system of the present disclosure can be used to determine that the subject transitions from a reference brain state to a target brain state based on the bioelectrical signals. As indicated in the descriptions for operation 420 of FIG. 4, this transition can serve as a triggering event that leads to certain operations, which are illustrated in 540, 550, and 560. The descriptions for operations 540, 550, and 560 can be supplemented by the descriptions for operation 240 of FIG. 2 and operations 350, 355, 360, and 365 of FIG. 3. In some embodiments, operations of 540, 550, and 560 can be carried out by the bioelectrical signal acquisition device, the computational device, or a combined device.

As shown in operation 540 of the process illustrated in FIG. 5, the interactive system of the present disclosure can be used to adjust a controlled parameter of signals when the transition from the reference brain state to the target brain state occurs. As shown in operation 560 of the process illustrated in FIG. 5, the interactive system of the present disclosure can be used to terminate one or more existing operations when the transition from the reference brain state to the target brain state occurs.

Operations 540 and 560 are provided as an example for operations that do not directly involve the subject, and such operations may vary, including but not limited to: providing further signals to the subject, changing parameters, adjusting output/signals, making selections, sending messages, and/or terminating an on-going operation.

As shown in operation 550 of the process illustrated in FIG. 5, the interactive system of the present disclosure can be used to provide further signals to the subject when the transition from the reference brain state to the target brain state occurs. In some embodiments, the further signals in operation 550 are analogous to the further signals as described in operations 350 and 360.

The relationships between operations 540, 550, and 560 are also analogous to the relationships for operations 350-355 and 360-365. These operations can be mixed and conducted one after the other. For example, after adjusting the parameter of the signals, the computational device may provide the signals to the subject to elicit further responses; additionally or alternatively, the computational device may send signals to the subject to remind the subject to record the interacting process; additionally or alternatively, after further monitoring and detection of certain triggering event, the interactive system may terminate all existing operations.

Figure 6A:
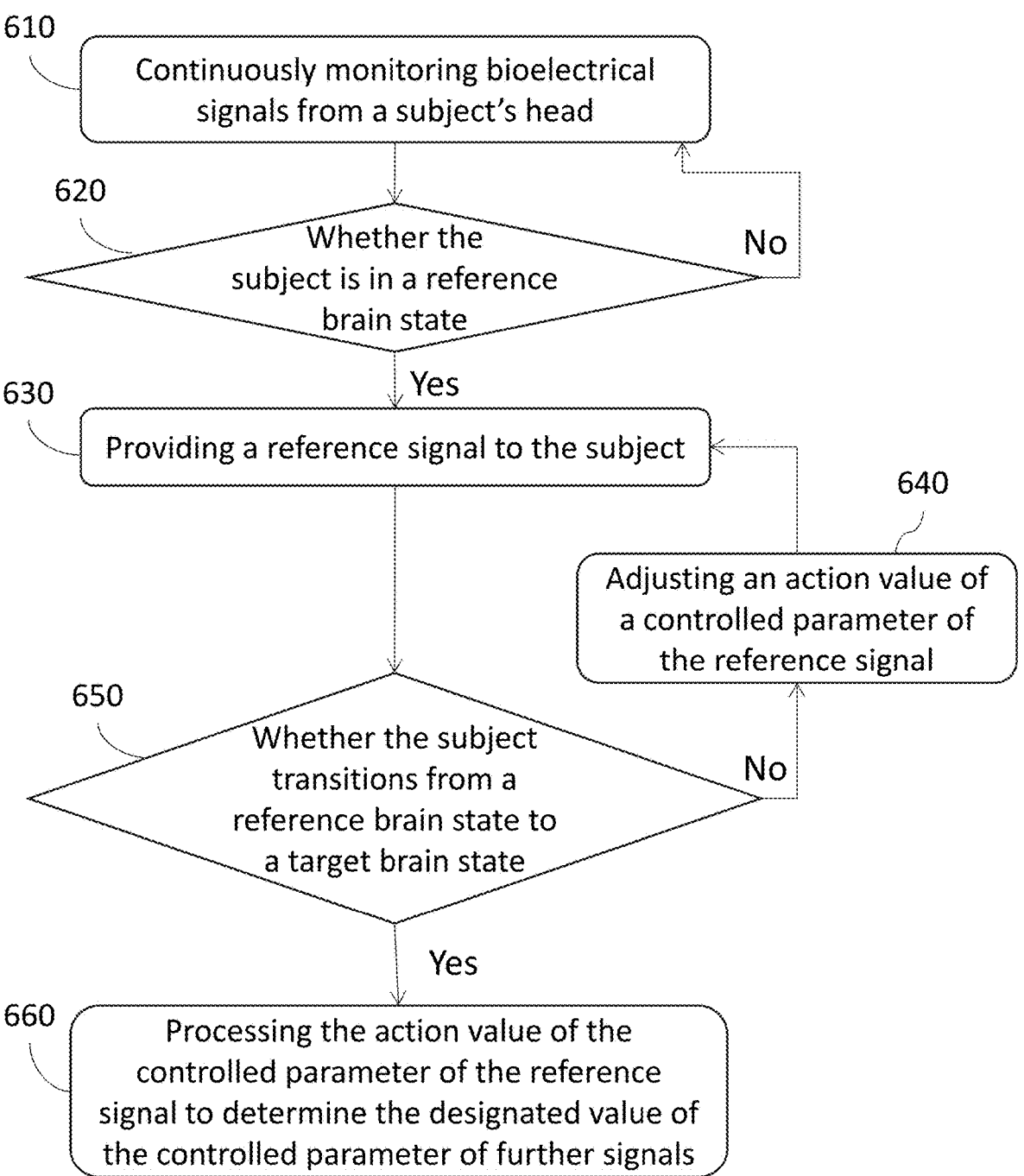
FIGS. 6A and 6B are flowcharts illustrating exemplary processes for human-computer interaction according to some embodiments of the present disclosure.

FIG. 6A is a flowchart illustrating an exemplary process for human-computer interaction according to some embodiments of the present disclosure, showing a calibration process. In some embodiments, the process shown in FIG. 6A may be considered a calibration regimen, which can be used to determine the initiation value of the controlled parameter of the interacting signals indicated in the description for operation 330 in FIG. 3.

As shown in operation 610 of the process illustrated in FIG. 6A, the interactive system of the present disclosure can be used to monitor the bioelectrical signals from a subject (e.g., from the subject's head).

As shown in operation 620 of the process illustrated in FIG. 6A, the interactive system of the present disclosure can be used to determine whether the subject is in a reference brain state. In some embodiments, the determination is made based on the bioelectrical signals. If it is determined that the subject is in the reference brain state, the process shown in FIG. 6A proceeds to further operations (in some cases, monitoring continues). If it is determined that the subject is not in the reference brain state, monitoring continues without proceeding to the further operations.

As shown in operation 630 of the process illustrated in FIG. 6A, the interactive system of the present disclosure can be used to provide a reference signal to the subject. In some embodiments, the reference signal is analogous to the interacting signals described in operation 330 of FIG. 3 or the stimulating signals in operation 360 of FIG. 3, the descriptions of which can be adopted to supplement the descriptions for operation 630.

As shown in operations 640 and 650 of the process illustrated in FIG. 6A, the interactive system of the present disclosure can be used to determine whether the subject transitions from the reference brain state to a target brain state. If the transition occurs, the process in FIG. 6A proceeds to further operations. If the transition does not occur, the interactive system may adjust an action value of a controlled parameter of the reference signal and revert back to operation 630, thereby providing the reference signal again.

As shown in operation 660 of the process illustrated in FIG. 6A, the interactive system of the present disclosure can be used to process the action value of the controlled parameter of the controlled parameter of the reference signal to determine the designated value of the controlled parameter.

The operations shown in FIG. 6A form a regimen to determine a threshold value of a controlled parameter. Essentially, the transition from the reference brain state to the target brain state is used as a testing event for the controlled parameter of the reference signal. Whether this event occurs will, at least in part, determines the value of the controlled parameter.

The operations in FIG. 6A can have various applications in specific scenarios. For example, if the goal is to test find a maximum or close-to-maximum value for the controlled parameter so that the subject does not transition to the target brain state, then the action value can start relatively low and each time for operation 640, the action value of the controlled parameter is incrementally increased until the transition occurs; then in operation 660, the second-to-last action value (because the second-to-last value is the highest value that does not cause the transition) or another value lower than the last action value (e.g., reduction by a small amount, such as 1%, 2%, 5%, 10%, 15%, or 20%) may be determined as the designated value of the controlled parameter. In some embodiments, this designated value can be used as an initiation value for the controlled parameter to be used for interacting signals configured to communicate with the subject in a certain brain state, e.g., as indicated in the descriptions for operation 330 of FIG. 3. This designated value may increase the chance that the interacting signals may work properly for the first time because this value has been tested to not trigger a transition but remains close to the threshold.

Similarly, if the goal is to find the minimum value for the controlled parameter so that the subject does transition to the target brain state, the last action value would be determined as the designated value of the controlled parameter. For example, this can be used to find a parameter value for an effective but less intrusive wake-up signal.

Figure 6B:
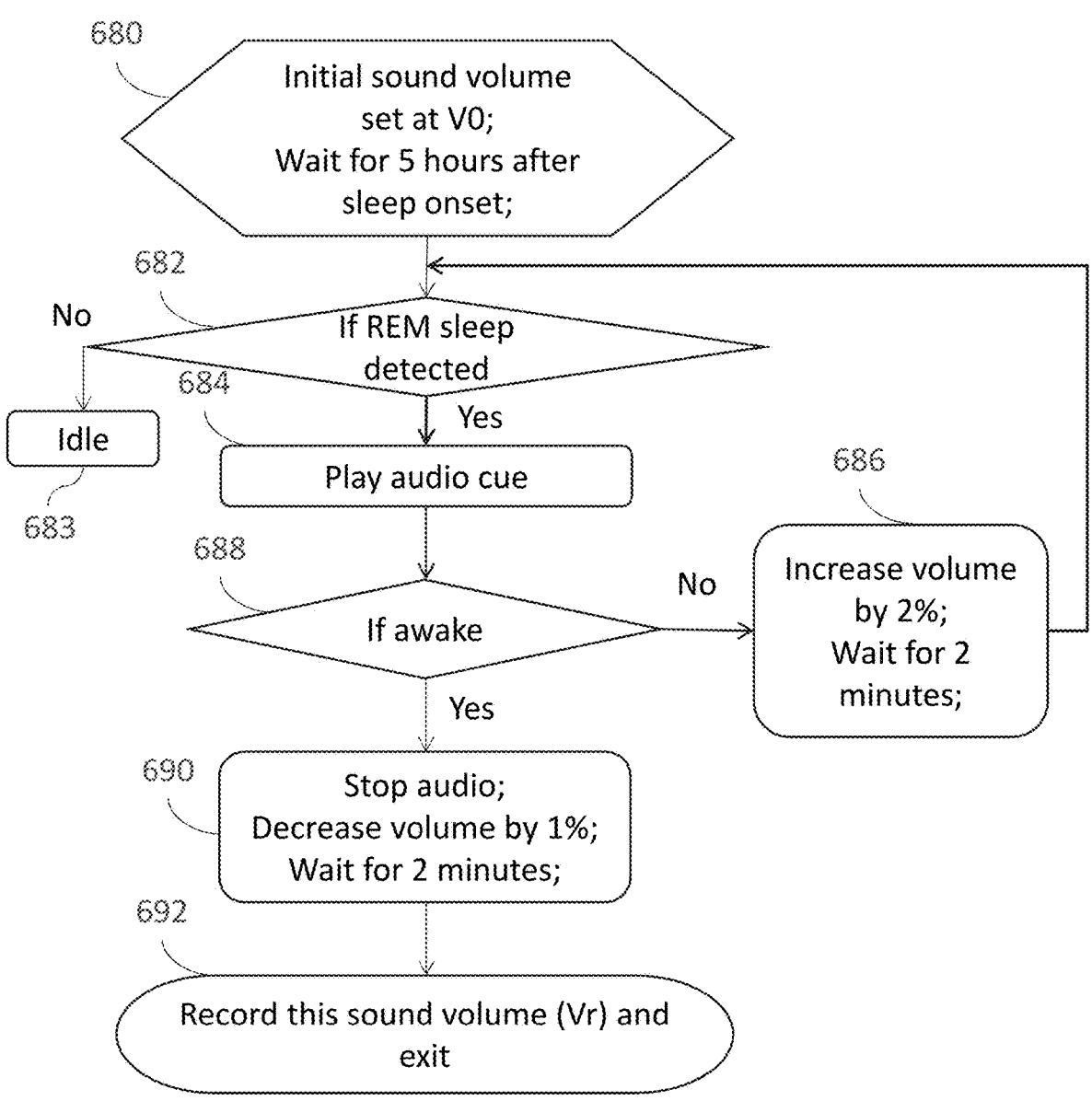

FIG. 6B shows a specific example of the calibration process generally presented in FIG. 6A and provides additional features. As shown in operations 680, 682, 683, 684, 686, 688, 690 and 692 of FIG. 6B, the interactive system of the present disclosure may adopt an initial sound volume (the controlled parameter) set at V0 (the action value) for an audio cue (the reference signal); when it is determined that the subject is in REM sleep (the reference brain state), the interactive system plays the audio cue (providing the reference signal) to the subject; if the subject does not become awake(transition from the reference brain state to a target brain state), then the volume is adjusted by an increase of 2% (adjusting the action value); after two minutes, the interactive system plays the audio cue again if the subject is still in REM sleep; when the subject becomes awake, the last audio volume is decreased by 1% and recorded as Vr (the designated value of the controlled parameter).

In addition to the general scheme shown in FIG. 6A, operations 682, 683, 684, 686, and 688 also show an additional feature: each time when the action value is adjusted, in certain embodiments, the interactive system may determine again whether the subject is still in the reference brain state; if the subject is no longer in the reference brain state (in this case REM), but does not transition to the pre-determined target brain state (in this case awake), the interactive system may wait (idle but continue to monitor bioelectrical signals) so that the subject can return to the reference brain state again.

Figure 7A:
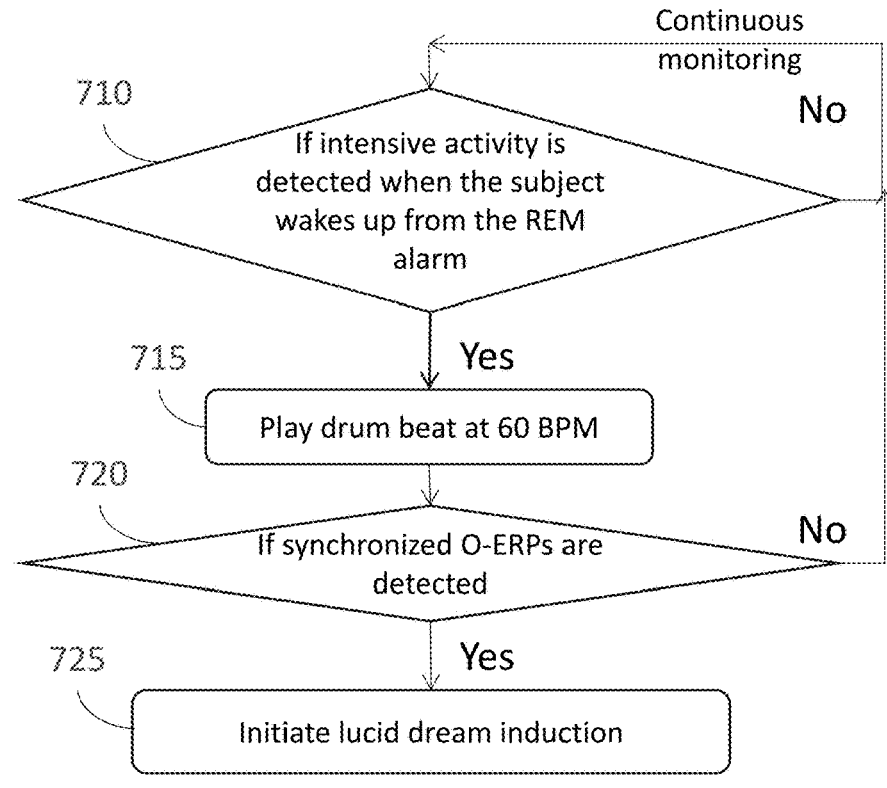
FIGS. 7A and 7B are flowcharts illustrating an exemplary process for human-computer interaction according to some embodiments of the present disclosure, showing examples of decision making based on brain state determination and o-ERP detection.
Figure 7B:
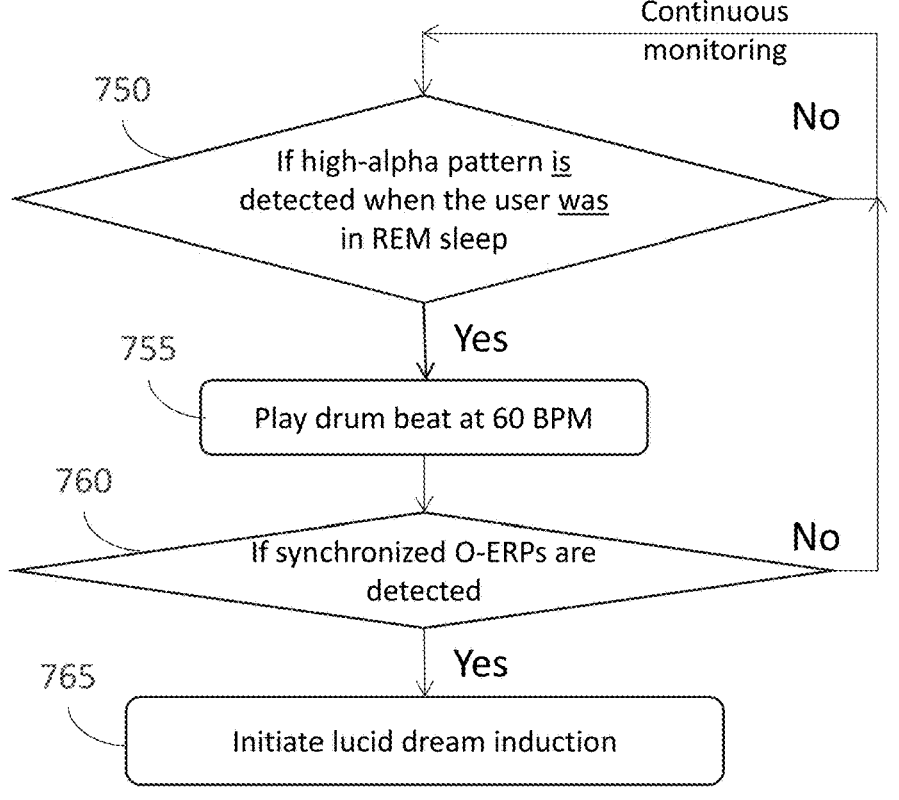
Figure 7C:
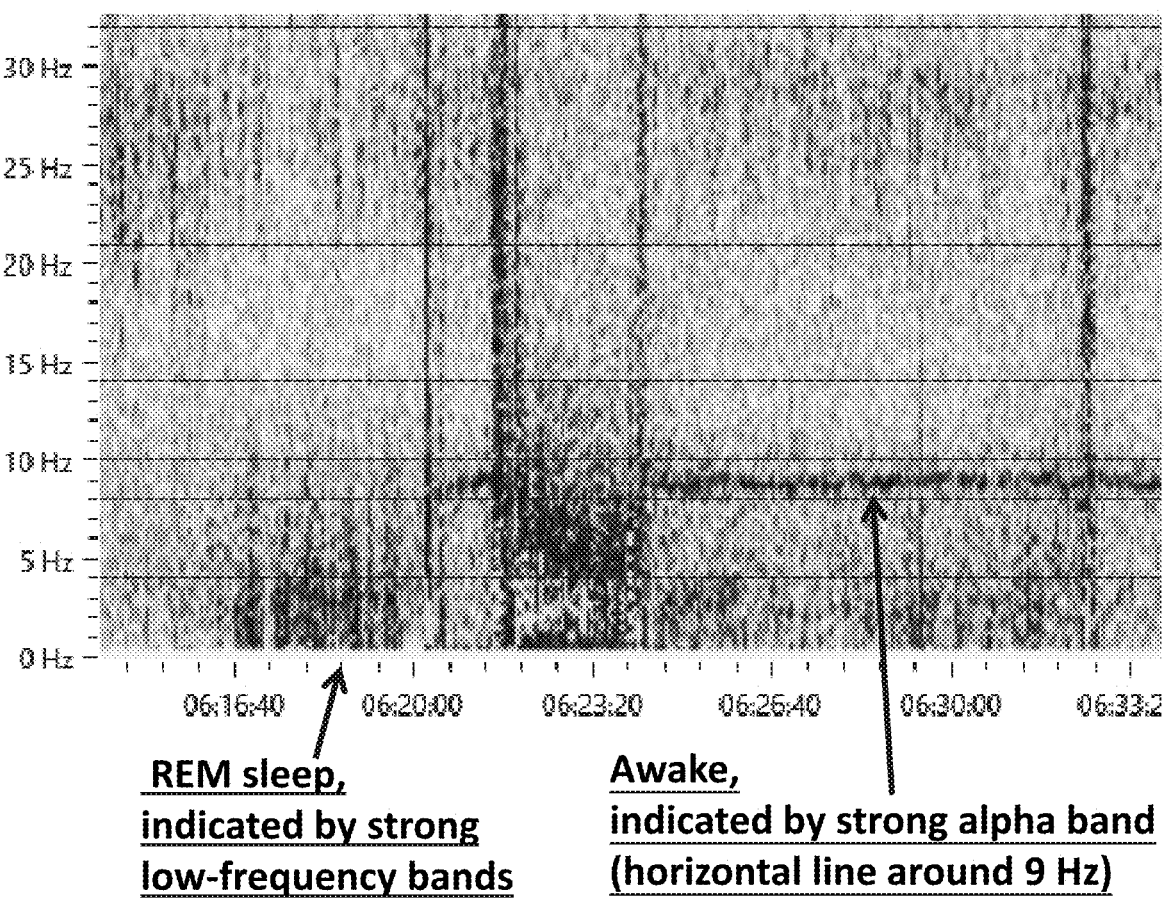
FIG. 7C provides an example of digital bioelectrical signal recording, showing indicators of brain state transition and presenting evidence that supports the practicality of the processes of the present disclosure.

FIGS. 7A and 7B are flowcharts illustrating an exemplary process for human-computer interaction according to some embodiments of the present disclosure, showing examples of decision making based on brain state determination and o-ERP detection; FIG. 7C provides an example of digital bioelectrical signal recording, showing indicators of brain state transition and presenting evidence that supports the practicality of the processes of the present disclosure.

In FIGS. 7A and 7B, as shown by operations 710, 715, 720 and 725 and operations 750, 755, 760 and 765, the interactive system may determine that the subject is transitioning from a reference brain state (REM) to a target brain state (awake); then the interactive system may provide interacting signals to the subject in the form of drum beat at 60 BPM (beats per minute); if o-ERPs that are synchronized to the drum beats are detected, the interactive system may conduct an operation (initiating lucid dream induction) based on the determination that the subject is awake (or is in an REM to Wake transitioning state) and that o-ERPs with pre-determined patterns are detected.

Not all o-ERPs are the results of the subject's voluntary actions. There are o-ERPs that are produced by the subject involuntarily, and such o-ERPs cannot be considered the subject's voluntary actions or response. In some embodiments, the o-ERPs that result from the subject's voluntary responses to interacting signals are called qualified o-ERPs (e.g., see FIGS. 8-9 and 10A-10D). In some embodiments, one approach to discern the voluntary o-ERPs is to inquire whether the o-ERPs are in sync with inputs such as interacting signals provided to the subject. For example, as shown in FIGS. 7A and 7B, the interacting signals are provided in the form of repetitive drumbeats. If the o-ERPs that occurs closely after the interacting signals are detected to have the same or substantially similar pattern as the interacting signals, then it can be decided that the o-ERPs are qualified o-ERPs that can be used as the basis for further operations. The other possible approach to discern voluntary o-ERPs is to detect o-ERP patterns pre-set by the subject or agreed to beforehand by the subject. In this case, it is not required to provide interacting signals to the subject, the subject can act voluntarily on his/her own initiative, to produce o-ERPs (e.g., by eye movement, eye squeeze, or eye blink) that fit the pre-determined pattern. By detecting o-ERPs with such patterns, the interactive system can determine that voluntary o-ERPs are detected.

The embodiments represented by FIG. 7A and FIG. 7B differ in the way as to how the transition from the REM state to the wake state is detected. In FIG. 7A, the transition is detected by the presence of intensive activity in the bioelectrical signals. In some cases, when the subject wakes up, there is intense change of bioelectrical signals, especially with the strong presence the EMG. Based on such observations, the interactive system may determine that the subject is waking up. In certain alternative embodiments, the fact that the subject wakes up can be ascertained by direct visual observation.

In FIG. 7B, and also referring to FIG. 7C, which provides corresponding bioelectrical signals to 750 of FIG. 7B, the transition is detected by the presence of strong-alpha pattern in the bioelectrical signals, as well as the determination that the subject was just in the REM state. In some cases, the fact that a person has just woken up may not be directly visible because the person may stay still without significant movements. Reading of the bioelectrical signals, as shown in FIGS. 7A-7C, especially in the cases of 7B and 7C, can provide more precise indication as to the transition to another brain state.

Upon determining that the subject is in a wake state (or in a REM to wake transition state), the interactive system may conduct an operation. As shown in FIGS. 7A and 7B, the operation is to induce lucid dream for the subject. It is noted that other operations, for example as discussed in the descriptions for FIGS. 2-5, are also possible.

In some embodiments, lucid dream induction can be carried out by the interactive system through a number of approaches. Examples of lucid dream induction techniques include but are not limited to: the mnemonic induced lucid dream (MILD) technique (e.g., guide the subject to think "next time I dream, I will know I am dreaming", and visualize the dream and a clue that can reveal its dreaming nature), the wake induced lucid dream (WILD) technique (e.g., guide the subject to stay motionless but conscious, in order to directly enter a lucid dream (possibly with a brief sleep paralysis)), the finger induced lucid dream (FILD) technique (e.g., guide the subject to stay motionless, and to image periodical finger tapping every time the phone vibrate, till falling asleep), the senses induced lucid dream (SSILD) technique (e.g., when awake, guide the subject to cycle his/her thoughts through senses with short cycles and long cycles, then sleep; stop the audio when the sleep state is detected). These techniques can be employed as the operation being conducted by the interactive system in various embodiments.

Figure 10A:
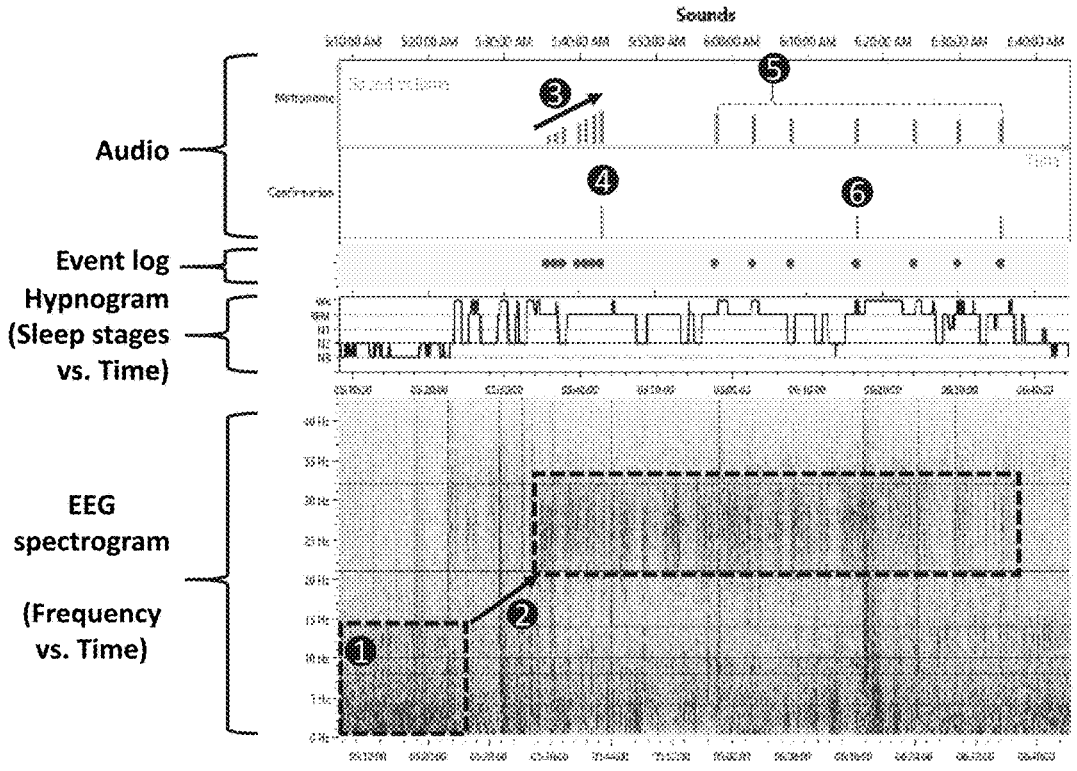
FIGS. 10A-10D are exemplary data groups according to some embodiments of the present disclosure.

In some embodiments, lucid dream induction can start when the subject is in a wake state or in a transition-to-wake state, as shown in FIGS. 7A and 7B. In some embodiments, lucid dream induction can start when the subject is in the REM state, as shown in FIG. 10A.

The embodiments represented by FIGS. 7A and 7B essentially illustrate a combination of the processes shown in FIG. 2 and FIG. 4. In essence, the transitioning from one brain state to another triggers the operation to observe qualified o-ERPs. The determination that the subject is in the new brain state and the presence of the qualified o-ERP will in turn trigger further operations, such as the operations described for FIGS. 2-5. In some embodiments, the operations may include inducing a lucid dream state.

Figure 8:
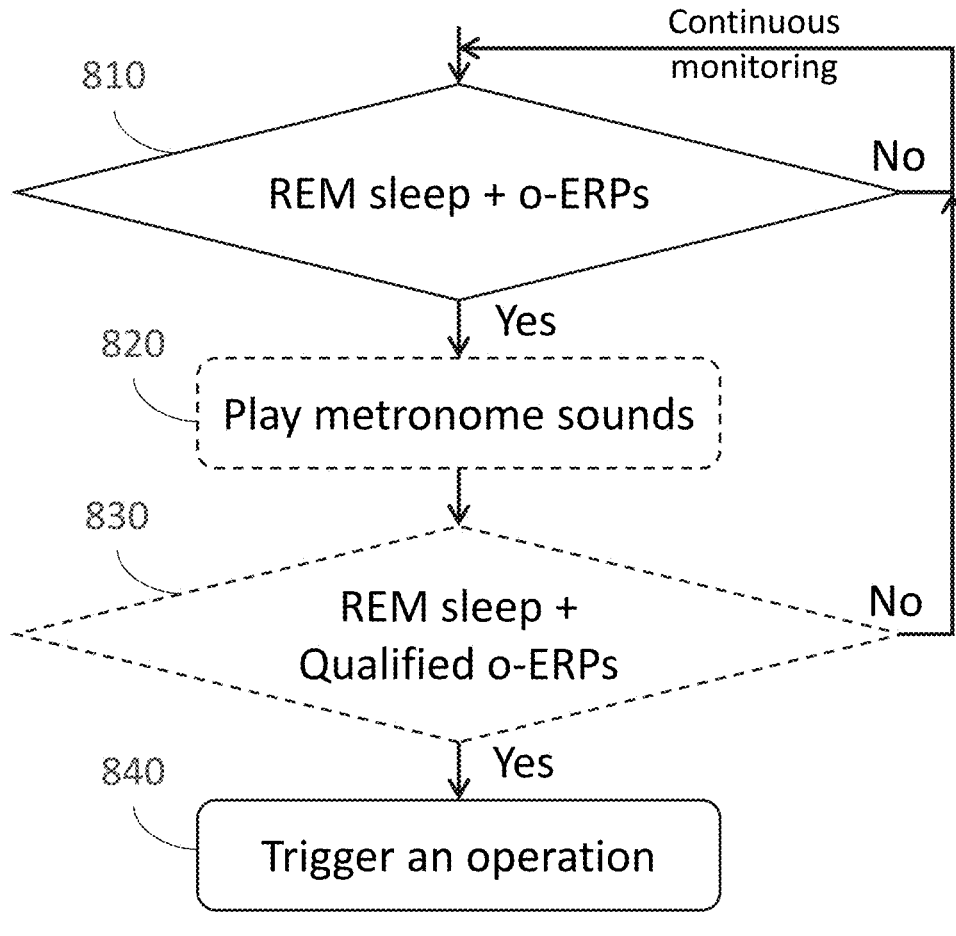
FIG. 8 is a flowchart illustrating an exemplary process for human-computer interaction according to some embodiments of the present disclosure, showing decision making based on brain state determination and o-ERP detection.

FIG. 8 is a flowchart illustrating an exemplary process for human-computer interaction according to some embodiments of the present disclosure, showing decision making based on brain state determination and o-ERP detection.

As shown in FIG. 8, the interactive system may determine that the subject is in the REM state based on continuous monitoring of bioelectrical signals. As indicated in the description of some embodiments of the present disclosure, the subject can pre-set or agree beforehand to certain patterns so that when he/she is in a lucid dream state, he/she can use eye movement or changing gazing direction in the dream to indicate the on-set of lucid dream. As indicated in 810 of FIG. 8, in some embodiments, with the determination of REM and detection of o-ERPs, the interactive system may proceed to conduct an operation, as shown in 840 (skipping 820 and 830).

In some embodiments, however, the detection of o-ERPs may not be enough for the interactive system to proceed directly to 840. The reasons for the detected o-ERPs to be suspect can vary. First and foremost, as indicated above, not all o-ERPs are voluntary; in some cases, even involuntary o-ERP can show a pattern that may fit pre-set or agreed-upon pattern. In addition, sometimes the detected o-ERPs only fit part of the pre-set or agreed-upon pattern, making the determination as to whether the o-ERP is legit to be rather difficult. Therefore, in some embodiments of the present disclosure, there may be additional confirmation steps such as, but not limited to, operations 820 and 830 of FIG. 8.

In 820 and 830 of FIG. 8, the interactive system may use interacting signals to verify whether the subject is in a lucid dream state. One possible type of interacting signals, as shown in operation 830 of FIG. 8, is metronome sounds, such as but not limited to the drumbeats used in the embodiments of FIGS. 7A and 7B. If the subject can produce o-ERPs that match the interacting signals, or o-ERPs with a pattern that was pre-set or agreed-upon beforehand, such o-ERPs can be considered qualified o-ERPs that may verify that the subject is in a lucid dream state.

In some embodiments, operations 820 and 830 are not implemented. In some embodiments, operations 820 and 830 are always implemented. In some embodiments, there can be an extra step to determine whether 820 and 830 should be skipped. Whether to skip operations 820 and 830 can depend on various factors. For example, a matching can be first conducted; if the initially detected o-ERPs present a pattern that does match the pre-determined pattern, or if the matching level is higher than a threshold, then 820 and 830 cannot be skipped; if the initially detected o-ERPs present a pattern that does not match the pre-determined pattern, or if the matching level is lower than a threshold, then 820 and 830 can be skipped.

As indicated in 840 of FIG. 8, the determination of REM, as well as the determination and/or confirmation of o-ERP detection, can indicate that the subject is experiencing lucid dreams. The interactive system can then conduct further operations, some of which are described in the descriptions for FIGS. 2-5. For lucid dream state, the interactive system can send signals to further enhance, colorize, improve, and/or terminate the lucid dream. The further interacting signals can take various forms as described above. For example, the further interacting signals may include voice instructions to induce certain scenes to be visualized, certain sounds to be heard, or certain experience to be revisited. In a lucid dream state, the subject may also communicate further with the interactive system.

In some embodiments, the subject may notify, inform, and/or respond to the interactive system in the o-ERPs (e.g., using o-ERPs to make selections according to a list presented by the interactive system to the subject). In some embodiments, the signals from the subject, e.g., in form of o-ERPs, can trigger further operations by the interactive system. For example, the signals form the subject may cause the interactive system, e.g., using the computational device, to change parameters, adjust output/signals, make selections, send messages, and/or terminating an on-going operation.

In some embodiments, the interactive system of the present disclose may be used by the subject to connect with others that are also experiencing or trying to experience lucid dreams. For example, signals from one subject having lucid dreams may instruct the interactive system to send messages to others that are also trying to experience lucid dreams, triggering other systems to induce lucid dream for other subjects or initiate a communication with others that are experiencing lucid dreams. For another example, a number of subjects may use the interactive systems to connect with each other before the on-set of lucid dreams; whenever lucid dream induction is successful one subject, the associated interactive system may communicate with other interactive systems so the all the members that can experience lucid dream successful can communicate with one another. With enough relay messaging and/or back and forth, a lucid dream network may be established with the assistance of the interactive system and methods in the present disclosure.

Figure 9:
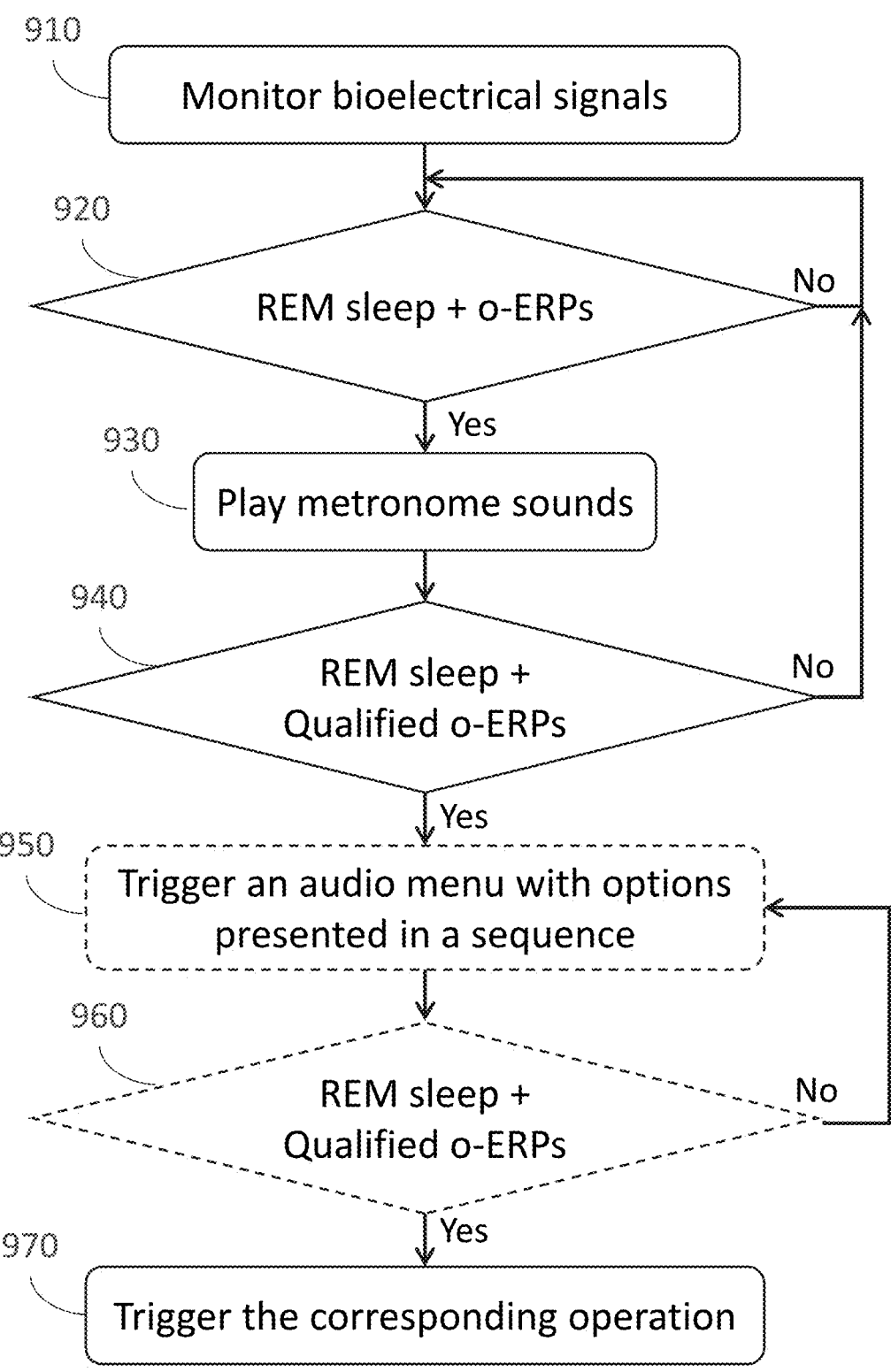
FIG. 9 is a flowchart illustrating an exemplary process for human-computer interaction according to some embodiments of the present disclosure, showing decision making based on brain state determination and o-ERP detection, as well as a built-in confirmation operation.

FIG. 9 is a flowchart illustrating an exemplary process for human-computer interaction according to some embodiments of the present disclosure, showing decision making based on brain state determination and o-ERP detection, as well as a built-in confirmation operation. Operations 910, 920, 930, and 940 in FIG. 9 are essentially the same as operations 810, 820 and 830 in FIG. 8, where bioelectrical signal monitoring is also mentioned. In essence, FIG. 9 represent a sub-group of embodiments to the embodiments represented by FIG. 8.

As show in FIG. 9, after verification in operation 940, the interactive system may, in certain embodiments, proceed to send further interacting signals to the subject with the computational device. In certain embodiments, the further interacting signals are in the form of an audio menu with options presented in a sequence. For example, the menu can include: "Move your eyes now to choose the sky-theme for your dream", followed by metronome sound; when no matching o-ERP is detected: "Move your eyes now to choose the ocean theme for your dream", followed by metronome sound, etc. Such sequential presentation of the list would allow the subject to make selections and proceed with further communication and modulation of the subject's experience, as well the function and operations of the computational device.

FIGS. 10A-10D are exemplary data groups according to some embodiments of the present disclosure. In particular, FIG. 10A is an exemplary digital bioelectrical signal recording that demonstrates the change of bioelectrical signals, event logs, and interacting signals therein provided. Here, a real-life case of lucid dream induction based on brain state determination and o-ERP detection. As marked in FIG. 10A, certain events are marked with numbers:

(1) 5:00 AM—The subject was in non-REM sleep;

(2) 5:34 AM—The subject's sleep transitioned from "non-REM" to "REM";

(3) 5:35 AM—The system started to play audio cues with increasing sound volumes;

(4) 5:42 AM—The subject woke up as the audio cue became loud enough. After stopping the audio cue using pre-agreed eye movements, the subject resumed sleep; this volume was then identified as the "threshold volume" between REM sleep and waking;

(5) 5:57 AM—The system started to play audio cues periodically at a volume that is slightly lower than the "threshold volume" in step (4);

(6) 6:16 AM—The audio cue made the subject realize that he was dreaming; the subject looked "left-right-left-right" in the dream world; the o-ERPs generated by the associated eye movements were detected, then triggered pre-set audio signals.

In essence, FIG. 10A presents a real-life example of a lucid dream induction process that includes: detecting transition from one brain state to another; calibration of controlled parameter; induction of lucid dream state when the subject is asleep; confirmation of induction by detecting qualified o-ERPs; and triggering of further operations.

Figure 10B:
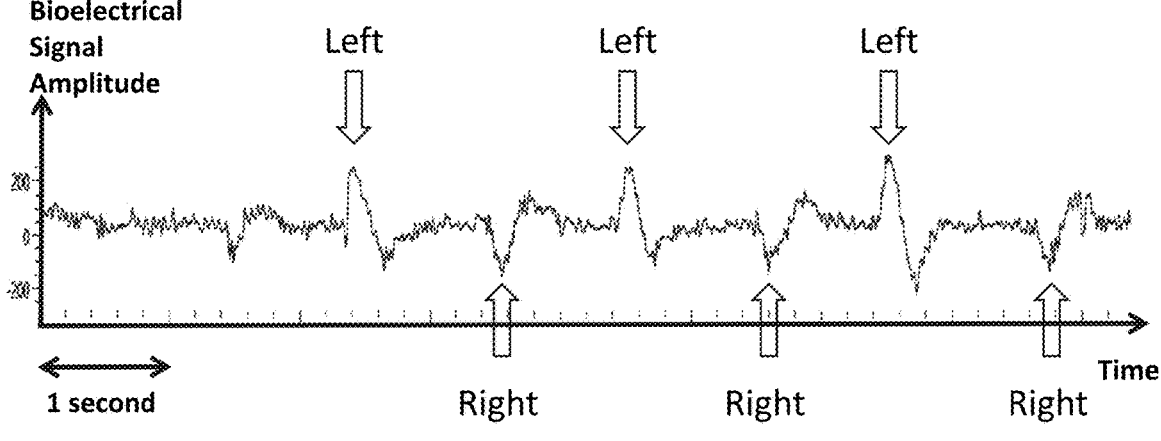
Figures 10C, 10D:
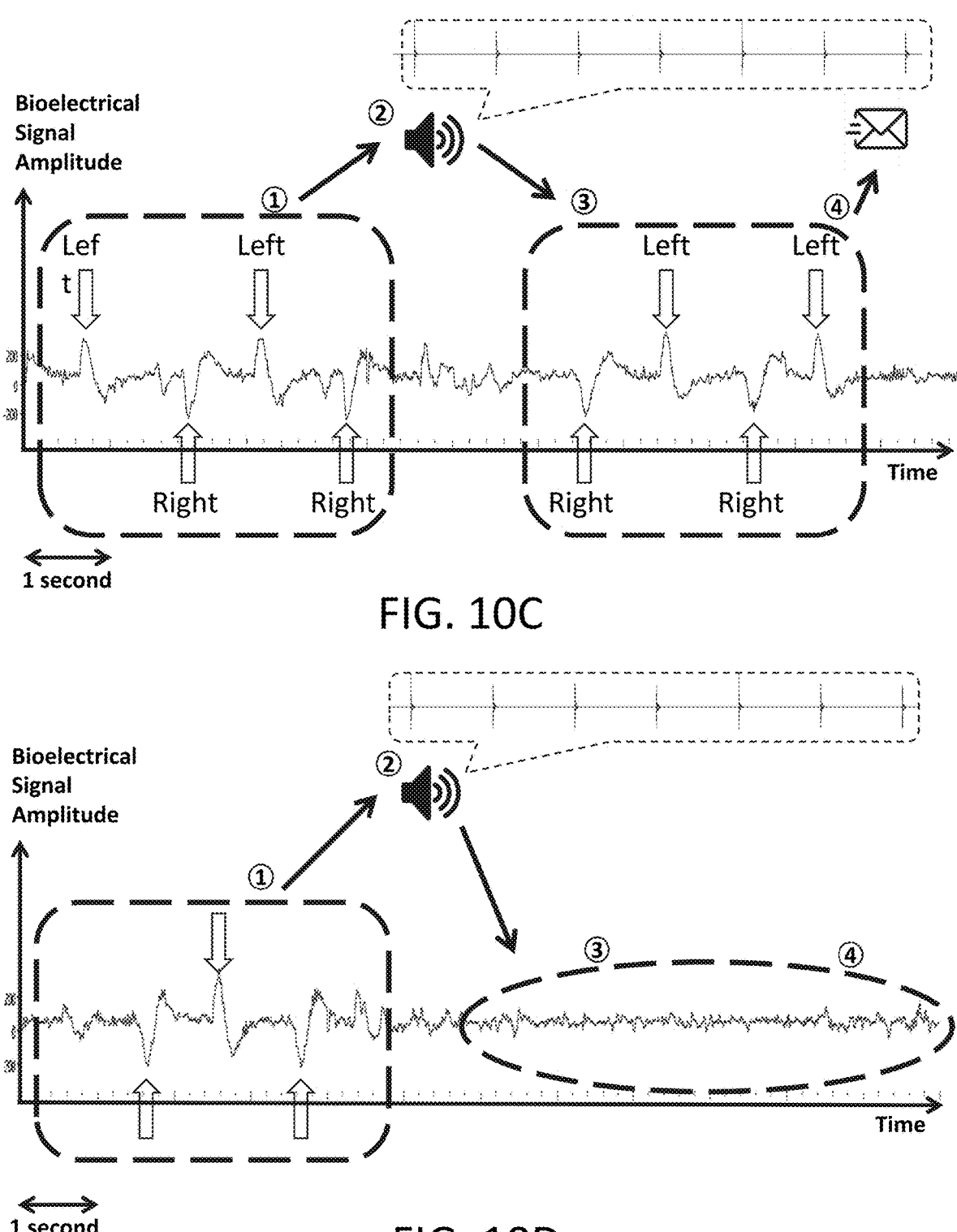

FIGS. 10B-10D show exemplary bio-signal data that demonstrates the features of some qualified o-ERPs. FIG. 10B shows an example data segment of o-ERPs associated with eye movements in a pre-set "Left-Right-Left-Right-Left-Right" (LRLRLR) pattern. It is clear that such eye movements can produce corresponding o-ERPs in the form of bioelectrical signal amplitude peaks. The "LRLRLR" pattern can be achieved by moving eyes left-right-left-right-left-right when the subject is awake or changing gazing directions with the same sequence in a dream.

FIG. 10C shows first a group of o-ERPs directly initiated by the subject, and then qualified o-ERPs that are in response to audio cues. Marked by the numbers in FIG. 10C:

(1) The subject moved eyes with a pre-set pattern to trigger the interactive system's response;

(2) Upon detection of the o-ERPs associated with the eye movements and the target brain state, the computational device played metronome sounds at 1 beat per second;

(3) The subject moved eyes at the same pace as the given metronome;

(4) The computer sent out a pre-configured message.

FIG. 10D shows first a group o-ERPs directly initiated by the subject, but then qualified o-ERPs that are in response to audio cues cannot be detected. This is case of non-confirmation. In some sense, this is an example of how the system avoids false-triggering by spontaneous eye movements during REM sleep. Marked by the numbers in FIG. 10D:

(1) A suspected pattern of o-ERPs are detected;

(2) Upon detection of the o-ERPs and the target brain state, the computer played metronome sounds at 1 beat per second;

(3) No o-ERP was detected within a pre-defined window;

(4) No action is triggered; monitoring continues.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure. Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. Program code embodied on a computer readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated.

Each of the patents, patent applications, publications of patent applications, and other material, such as articles, books, specifications, publications, documents, things, and/ or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

I claim:

1. A method of human-computer interaction, comprising:
   continuously monitoring bioelectrical signals from a subject's head;
   determining that the subject is in a reference brain state based on the bioelectrical signals;
   providing interacting signals to the subject;
   detecting one or more ocular event-related potentials (o-ERPs) based on the bioelectrical signals, wherein the o-ERPs are results of the subject's voluntary action in response to the interacting signals, wherein the voluntary action includes eye movement, eyelid squeeze, or eye blink; and
   conducting an operation, with a computational device, based on the reference brain state and the o-ERPs, wherein:
   the interacting signals include audio signals, visual signals, or mechanical signals, or a combination thereof, and the reference brain state is a wake state, a meditation state, a sleep state, a rapid eye movement (REM) state, a non-REM to REM transition state, a dream state, a lucid dream state, a hypnagogic state, a sleep paralysis state, a micro-awakening state, an increased arousal level state, or a recent wake-up state, or a transitioning state between any of two states thereof,
   at least a portion of the interacting signals have a controlled parameter with an initiation value that is determined by a calibration regimen, and
   the calibration regimen includes:
   providing a reference signal to the subject;
   determining whether the subject transitions from the reference brain state to the target brain state based on the bioelectric signals; and
   if the subject does not transition to the target brain state, enhancing an action value of the controlled parameter of the reference signal and restarting the calibration regimen upon detection of the reference brain state again; and
   if the subject transitions to the target brain state, processing the action value of the parameter of the reference signal to determine the initiation value of the controlled parameter of the reference signals.

2. The method of claim 1, wherein the conducting the operation includes adjusting a parameter associated with an output, adding a log record, sending a message, updating a social network status, turning on camera, or activating a menu.

3. The method of claim 1, wherein the conducting the operation includes providing further signals with the computational device to the subject, wherein the further signals include audio signals, visual signals, or mechanical signals, or a combination thereof.

4. The method of claim 3, wherein the further signals include further interacting signals, which are used to communicate with the subject, and
   the method further comprises:
   detecting further o-ERPs based on the bioelectrical signals, wherein the further o-ERPs are generated by voluntary eye movement, eyelid squeeze, or eye blink by the subject in response to the further interacting signals.

5. The method of claim 3, wherein the further signals include stimulating signals configured to induce a target brain state.

6. The method of claim 1, wherein the interacting signals are pre-set by the subject or agreed to by the subject.

7. The method of claim 1, wherein the bioelectrical signals from the subject's head include electroencephalogram (EEG), electromyogram (EMG), and/or electrooculogram (EOG) signals.

8. A method of human-computer interaction, the method comprising:

continuously monitoring bioelectrical signals from a subject's head, wherein the subject is asleep; and performing a calibration regimen, which includes:

providing a reference signal to the subject, wherein the reference signal has a controlled parameter with an action value;

determining whether the subject transitions from a sleep state to a wake state based on the bioelectric signals; and if the subject does not transition to the wake state, enhancing the action value of the controlled parameter of the reference signal and restarting the calibration regimen; and if the subject transitions to the wake state, determining a second-to-last value or a value lower than a last value of the controlled parameter as an initiation value of the controlled parameter; and providing interacting signals having the controlled parameter with the initiation value to the subject.

9. The method of claim 8, further comprising detecting o-ERPs based on the bioelectrical signals, wherein the o-ERPs are responsive to the interacting signals.

10. The method of claim 9, wherein the o-ERPs result from voluntary action of the subject.

11. The method of claim 8, wherein the interacting signals are used to induce the subject into a lucid dream state.

\* \* \* \* \*